(12) United States Patent
Gebald et al.

(10) Patent No.: US 11,612,879 B2
(45) Date of Patent: Mar. 28, 2023

(54) MATERIALS FOR THE DIRECT CAPTURE OF CARBON DIOXIDE FROM ATMOSPHERIC AIR

(71) Applicant: CLIMEWORKS AG, Zürich (CH)

(72) Inventors: Christoph Gebald, Zürich (CH); Jan André Wurzbacher, Zürich (CH); Angelo Vargas, Zürich (CH); Aylin Türkan Külür, Zürich (CH); Mathis Baumann, Zürich (CH); Alexander Spiteri, Zürich (CH); Tobias Niebel, Zürich (CH)

(73) Assignee: CLIMEWORKS AG, Zurich (CH)

( * ) Notice: Subject to any disclaimer, the term of this patent is extended or adjusted under 35 U.S.C. 154(b) by 289 days.

(21) Appl. No.: 16/762,796

(22) PCT Filed: Nov. 8, 2018

(86) PCT No.: PCT/EP2018/080655
§ 371 (c)(1),
(2) Date: May 8, 2020

(87) PCT Pub. No.: WO2019/092127
PCT Pub. Date: May 16, 2019

(65) Prior Publication Data
US 2021/0187480 A1 Jun. 24, 2021

(30) Foreign Application Priority Data

Nov. 10, 2017 (EP) .................................... 17201080
Feb. 19, 2018 (EP) .................................... 18157300

(51) Int. Cl.
| | | |
|---|---|---|
| *B01D 53/04* | (2006.01) | |
| *B01J 20/20* | (2006.01) | |
| *B01J 20/32* | (2006.01) | |
| *C01B 32/372* | (2017.01) | |
| *B01D 53/047* | (2006.01) | |
| *B01J 20/04* | (2006.01) | |
| *B01J 20/28* | (2006.01) | |
| *B01J 20/30* | (2006.01) | |

(52) U.S. Cl.
CPC ...... *B01J 20/3236* (2013.01); *B01D 53/0462* (2013.01); *B01D 53/0476* (2013.01); *B01J 20/043* (2013.01); *B01J 20/28021* (2013.01); *B01J 20/28052* (2013.01); *B01J 20/28061* (2013.01); *B01J 20/28064* (2013.01); *B01J 20/28066* (2013.01); *B01J 20/28071* (2013.01); *B01J 20/28073* (2013.01); *B01J 20/28083* (2013.01); *B01J 20/3007* (2013.01); *B01J 20/3204* (2013.01); *B01J 20/3293* (2013.01); *C01B 32/372* (2017.08); *B01D 2253/102* (2013.01); *B01D 2253/112* (2013.01); *B01D 2253/25* (2013.01); *B01D 2253/306* (2013.01); *B01D 2253/308* (2013.01); *B01D 2253/311* (2013.01); *B01D 2253/34* (2013.01); *B01D 2257/504* (2013.01); *B01J 2220/66* (2013.01)

(58) Field of Classification Search
CPC .... B01D 53/02; B01D 53/04; B01D 53/0462; B01D 53/0476; B01D 2253/102; B01D 2253/112; B01D 2253/25; B01D 2253/306; B01D 2253/308; B01D 2253/311; B01D 2253/34; B01D 2257/504; B01J 20/043; B01J 20/20; B01J 20/28021; B01J 20/28052; B01J 20/28061; B01J 20/28064; B01J 20/28066; B01J 20/28069; B01J 20/28071; B01J 20/28073; B01J 20/28083; B01J 20/28092; B01J 20/3007; B01J 20/3204; B01J 20/3236; B01J 20/3293; B01J 20/3483; B01J 20/3491; B01J 2220/66; C01B 32/372; Y02C 20/40
USPC ........ 96/108, 131, 153; 95/96, 139; 423/230
See application file for complete search history.

(56) References Cited

U.S. PATENT DOCUMENTS

| | | |
|---|---|---|
| 3,511,595 A | 5/1970 | Fuchs |
| 4,433,981 A | 2/1984 | Slaugh et al. |
| 4,493,715 A | 1/1985 | Hogan et al. |
| 4,770,678 A * | 9/1988 | Haslett, Jr. ......... B01D 53/0415 166/267 |
| 6,280,503 B1 | 8/2001 | Mayorga et al. |
| 2006/0148642 A1 | 7/2006 | Ryu et al. |
| 2007/0028773 A1* | 2/2007 | Jain ........................ B01D 53/02 95/135 |
| 2009/0120288 A1 | 5/2009 | Lackner et al. |
| 2010/0034724 A1 | 2/2010 | Keith et al. |
| 2010/0251887 A1 | 10/2010 | Jain |
| 2015/0139887 A1* | 5/2015 | Roestenberg ...... B01J 20/28045 252/190 |
| 2016/0082411 A1 | 3/2016 | Eom et al. |

FOREIGN PATENT DOCUMENTS

| | | |
|---|---|---|
| WO | 2012/168346 A1 | 12/2012 |
| WO | 2014/012963 A1 | 1/2014 |
| WO | 2016/161998 A1 | 10/2016 |
| WO | 2016/185387 A1 | 11/2016 |

OTHER PUBLICATIONS

International search report for application PCT/EP2018/080655 dated Jan. 7, 2019.

(Continued)

*Primary Examiner* — Frank M Lawrence, Jr.
(74) *Attorney, Agent, or Firm* — Sughrue Mion, PLLC

(57) ABSTRACT

The invention relates to a method to produce a particulate activated carbon material for capturing $CO_2$ from air, wherein the particulate activated carbon is impregnated with alkali carbonate salt such as $K_2CO_3$; and wherein the impregnated particulate activated carbon either has, determined using nitrogen adsorption methods, a pore volume of at least 0.10 $cm^3/g$ for pore sizes of at least 5 nm and a pore volume of at most 0.30 $cm^3/g$ for pore sizes of less than 2 nm or is based on a mixture of different alkali carbonate salts, or has a particular pore surface for pore sizes in the range of 2 nm-50 nm.

29 Claims, 11 Drawing Sheets

(56) References Cited

OTHER PUBLICATIONS

Written opinion for application PCT/EP2018/080655 dated Jan. 7, 2019.
Zhao et al. "Carbonation and Active-Component-Distribution Behaviors of Several Potassium-Based Sorbents", Industrial & Engineering Chemistry Research, vol. 50, No. 8, Apr. 20, 2011, pp. 4464-4470, XP055452936, ISSN: 0888-5885, DOI: 10.1021/ie200153c (7 pages total).
Zhao et al. "$CO_2$ Absorption Using Dry Potassium-Based Sorbents with Different Supports", Energy & Fuels, vol. 23, No. 9, Sep. 17, 2009, pp. 4683-4687, XP055533382, Washington, DC, US. ISSN: 0887-0624, DOI: 10.1021/ef900182d (6 pages total).
Zhao et al., "Multiple-Cycles Behavior of $K_2CO_3/Al_2O_3$ for $CO_2$ Capture in a Fluidized-Bed Reactor", Energy & Fuels, vol. 24, Feb. 18, 2010 (Feb. 18, 2010), pp. 1009-1012, XP055533613, DOI:10.1021/ef901018f, Retrieved from the Internet: URL:https://pubs.acs_org/doi/pdf/10.1021/ef901018f (4 pages total).
Shigemoto et al., "Material Balance and Energy Consumption for $CO_2$Recovery from Moist Flue Gas Employing $K_2CO_3$-on-Activated Carbon and Its Evaluation for Practical Adaptation", Energy & Fuels., vol. 20, No. 2, Feb. 17, 2006 (Feb. 17, 2006), pp. 721-726, XP055374715, Washington, DC, US. ISSN: 0887-0624, DOI: 10.1021/ef058027x (6 pages total).
Guo et al. "$CO_2$ Adsorption Kinetics of $K_2CO_3$/Activated Carbon for Low-Concentration $CO_2$ Removal from Confined Spaces", Chemical Engineering and Technology, vol. 38, No. 5, May 1, 2015, pp. 891-899, XP055452671 ,DE, ISSN: 0930-7516, DOI: 10.1002/ceat.201400383 (9 pages total).
Hayashi et al., "Efficient Recovery of Carbon Dioxide from Flue Gases of Coal-Fired Power Plants by Cyclic Fixed-Bed Operations over $K_2CO_3$-on-Carbon", Ind. Eng. Chem. Res. 1998, vol. 37, pp. 185-191 (7 pages total).
Prajapati et al., "Kinetic Studies of $CO_2$ Capture Using $K_2CO_3$/Activated Carbon in Fluidized Bed Reactor", Energy & Fuels, 2016, vol. 30, pp. 10758-10769 (12 pages total).
Veselovskaya et al., "Direct $CO_2$ capture from ambient air using $K_2CO_3/Al_2O_3$ composite sorbent", International Journal of Greenhouse Gas Control, vol. 17 (2013) pp. 332-340 (9 pages total).
Zhao et al., "Carbonation behavior of $K_2CO_3$/AC in low reaction temperature and $CO_2$ concentration", Chemical Engineering Journal, vol. 254 (2014) pp. 524-530 (7 pages total).
Guo et al., "Efficacious means for inhibiting the deactivation of $K_2CO_3$/AC for low-concentration $CO_2$ removal in the presence of $SO_2$ and $NO_2$", Chemical Engineering Journal, vol. 308, No. 17, Sep. 2016 (Sep. 17, 2016), pp. 516-526, XP029805107 (12 pages total).
B. Acar et al., "$CO_2$ adsorption over modified AC samples: A new methodology for determining selectivity", Catalysis Today (2017), http://dx.doi.org/10.1016/j.cattod.2017.10.011 (13 pages total).
Lee et al., "Development of Regenerable MgO-Based Sorbent Promoted with $K_2CO_3$ for $CO_2$ Capture at Low Temperatures", Environ. Sci. Technol. (2008), vol. 42, pp. 2736-2741 (6 pages total).
Chen et al., "A fluid mechanics approach to describing the behavior of pneumatically conveyed powder plugs", Powder Technology, vol. 124 (2002), pp. 127-137 (11 pages total).
Onischak et al., "Kinetics of Reaction of $CO_2$, With Solid $K_2CO_3$", 73 rd National AIChE Meeting in the Symposium on "Recent Advances in Separation Techniques", Aug. 29, 1972, Minneapolis, Minnesota (29 pages total).
Wei et al., "Nanopore structure characterization for organic-rich shale using the non-local-density functional theory by a combination of $N_2$ and $CO_2$ adsorption", Microporous and Mesoporous Materials, vol. 227, 2016, pp. 88-94 (7 pages total).

* cited by examiner

MATERIALS FOR THE DIRECT CAPTURE OF CARBON DIOXIDE FROM ATMOSPHERIC AIR

CROSS REFERENCE TO RELATED APPLICATIONS

This application is a National Stage of International Application No. PCT/EP2018/080655, filed on Nov. 8, 2018, which claims priority from European Patent Application No. 17201080.3 filed on Nov. 10, 2017, and European Patent Application No. 18157300.7, filed on Feb. 19, 2018.

TECHNICAL FIELD

The present invention relates to materials and processes for the direct capture of carbon dioxide from atmospheric air.

PRIOR ART

In order to limit climate change to acceptable levels it is necessary to reduce carbon dioxide ($CO_2$) emissions in the near future to zero as well as to achieve net carbon dioxide removal from the atmosphere. More than 87% of modeling scenarios of the Intergovernmental Panel on Climate Change ("IPCC") consistent with 2° C. of warming involve large-scale deployments of $CO_2$ removal technologies. Direct air capture of $CO_2$ ("DAC") can be an important technology in order to contribute to emission reduction through for example the supply of atmospheric $CO_2$ for the synthesis of renewable materials or fuels, as described in WO2016/161998. Further DAC can be important in order reduce the atmospheric $CO_2$ content through combination of DAC with a safe and permanent method to store the $CO_2$, e.g. through underground mineralization.

Different technologies for DAC have been described, e.g. DAC by liquid solutions of sodium hydroxide as described in US2010034724, DAC by basic ion exchange resins as described in US2009120288, DAC by amine-modified adsorbents as described in WO2012/168346, as well as DAC by $K_2CO_3$ impregnated supports as described in Veselovskaya et al. in International Journal of Greenhouse Gas Control 17 (2013) 332-340. Generally application of $K_2CO_3$ impregnated supports for $CO_2$ capture from flue gases and air is well known.

U.S. Pat. No. 3,511,595 describes a process for removing $CO_2$ from air of enclosed spaces based on particulate carriers of large surface area having distributed thereon an alkali metal carbonate, specifically $K_2CO_3$.

WO-A-2016/185387 describes a process for $CO_2$ capture from a gas stream based on a sorbent material having an alumina or a silica alumina support and where potassium carbonate ($K_2CO_3$) is impregnated on the support. The support has a surface area of 170-550 $m^2/g$, a pore volume of 0.18-0.95 $cm^3/g$ and a pore size of 10-30 nm.

WO-A-2014/012963 describes a material for reversibly adsorbing $CO_2$ from a gas mixture, specifically air, where the material is composed of a solid material made of ceramic, zeolite or activated carbon, having a surface area of 150-600 $m^2/g$, containing a salt capable of reacting with water and $CO_2$ to form bicarbonate, where the salt is of an alkali metal or an alkaline earth metal.

US-A-2006/0148642 describes a material for $CO_2$ capture from flue gas of fossil fuel fired power plants where the material is composed of 70% or less or a reactive compound which is capable to be converted to a metal carbonate, 70% or less of a solid porous non-metallic support and 70% or less of an inorganic binder, where the solid support is among the group of ceramic-like materials, including alumina, silica, magnesia, zirconia, titania, natural and synthesized zeolites, diatomaceous earth and carbon molecular sieves, having a surface area greater than 50 $m^2/g$.

U.S. Pat. No. 4,433,981 describes a process for removing $CO_2$ from a gas stream providing a porous alumina impregnated with a sodium or potassium salt, where the support has a surface area of at least 100 $m^2/g$.

U.S. Pat. No. 4,493,715 describes a method of removing $CO_2$ from olefin containing gas streams based on an alumina support having a surface area of greater than 50 $m^2/g$, preferably greater than 200 $m^2/g$ and where the support is impregnated with an alkali metal compound.

U.S. Pat. No. 6,280,503 describes a process for capturing $CO_2$ at high temperatures of 300-500° C. based on a sorbent containing a support of magnesium oxide as well as being impregnated with an alkali metal, e.g. potassium.

Veselovskaya et al. in International Journal of Greenhouse Gas Control 17 (2013) 332-340 describe an adsorbent for $CO_2$ capture from air, which is composed of an alumina support impregnated with $K_2CO_3$. The surface area of the pristine support was 240 $m^2/g$, the pore volume was 0.59 $cm^3/g$ and the average pore size 10 nm.

Guo et al. in Chem. Eng. Technol. 2015, 38, No. 5, 891-899 describe activated carbon impregnated with $K_2CO_3$ for $CO_2$ removal from confined spaces having low $CO_2$ concentrations. The support had a surface area of 579.57 $m^2$ and a pore volume of 0.33 $cm^3/g$. The authors concluded that mainly the pores in the size range of 1-10 nm are filled with $K_2CO_3$, where the pores in the size range of 10-100 nm are not filled with $K_2CO_3$.

Zhao et al. in Chemical Engineering Journal 254 (2014) 524-530 describe $K_2CO_3$ modified activated carbons for $CO_2$ removal from confined spaces. The surface area of the pristine support was 957 $m^2$, the pore volume was 0.362 $cm^3/g$ and the pore size was not disclosed.

Zhao et al. in Ind. Eng. Chem. Res. 2011, 50, 4464-4470 describes different supported $K_2CO_3$ sorbents for $CO_2$ capture from gas streams having a $CO_2$ concentration of 15%, 15% $H_2O$ and balance $N_2$. The authors conclude that the sorbents based on alumina are better than those based on activated carbon, since first allow for uniform distribution of $K_2CO_3$ on the support.

Hayashi et al. in Ind. Eng. Chem. Res. 1998, 37, 185-191 describe different $K_2CO_3$ modified activated carbon for $CO_2$ capture from gas streams containing 13.8% $CO_2$. The authors conclude that the macropores of activated carbons, thus the pores having a pore size greater than 50 nm, are filled with $K_2CO_3$ during impregnation and contribute in such to offer pore volume for the $CO_2$ capture process.

Prajapati et al. in Energy Fuels 2016, 30, 10758-10769 describes $K_2CO_3$/activated sorbent for $CO_2$ capture from gas streams with different $CO_2$ concentrations from 10-100% in a fluidized bed arrangement.

Acar et al in Catalysis Today 301, pages 112-124 discuss $CO_2$ Adsorption over modified AC samples and present a new methodology for determining selectivity. Activated carbon (AC) based adsorbents having high and stable $CO_2$ adsorption capacity with enhanced $CO_2$ selectivity in presence of $CH_4$ were developed. Alkali modified AC samples were prepared, their $CO_2$ adsorption capacities were measured, a new methodology for selective adsorption capacity determination under multicomponent gas mixture flow was developed, and the results were analyzed to determine the preparation procedure yielding optimum adsorbent design.

Two groups of adsorbents were prepared by $K_2CO_3$ impregnation on air and $HNO_3$ oxidized forms of a commercial AC followed by calcination at various temperatures. The resulting adsorbents were named according to calcination temperatures as ACxK-calT. The highest $CO_2$ adsorption capacity was measured on AC3K-300 sample as 110 mg/g. adsorbent at 1000 mbar $CO_2$ and 25° C. $CO_2$ adsorption was confirmed reversible, whereas $CH_4$ adsorption was found partially irreversible. The highest mass based $CO_2$:$CH_4$ selectivity, ca. 3.7, was achieved over AC2K-200 at 25° C. for the 50% $CO_2$-50% CH mixture. AC2K-200 was further tested at higher total pressures, for 0-5000 mbar pressure range, at 25° C. $CO_2$ adsorption capacity was measured as 197 mg/g. adsorbent at 5000 mbar $CO_2$. Among Langmuir, Freundlich and Dubinin-Radushkevich (D-R) isotherm models, D-R was found to be the most successful one explaining $CO_2$ adsorption behavior of AC samples.

Zhao et al in Chem. Eng. J. 254 (2014) 524-530 discuss the carbonation behavior of $K_2CO_3$/AC in low reaction temperature and $CO_2$ concentration. The carbonation behavior of $K_2CO_3$/AC was investigated in the condition of low reaction temperatures of 20-60° C. and low $CO_2$ concentrations of 0-4% in TGA. The reaction path of $K_2CO_3$/AC consists of two steps as that the hydration reaction occurs first to form $K_2CO_3$ 1.5 $H_2O$ and $K_4H_2(CO_3)_3$ 1.5$H_2O$, then $KHCO_3$ is produced rapidly. Besides the carbonation reaction, the adsorption process exists either. More $K_2CO_3$ will be converted to $KHCO_3$ for the sorbent with low $K_2CO_3$ loadings or in the conditions of high reaction temperature and low $H_2O$ concentration. More $K_4H_2(CO_3)3$ 1.5$H_2O$ and $K_2CO_3$1.5$H_2O$ will be formed for the sorbent with high $K_2CO_3$ loadings or in the conditions of low reaction temperature and high $H_2O$ concentration. The effect of the $CO_2$ concentration is not significant on the carbonation reaction paths of $K_2CO_3$/AC. On the contrary, the Relative Humidity (RH) plays an important role in this process. Lee et al in Environ. Sci. Technol., 2008, 42 (8), pp 2736-2741 discuss the development of regenerable MgO-based sorbent promoted with $K_2CO_3$ for $CO_2$ capture at low temperatures. To improve their $CO_2$ absorption capacity, alkali-based sorbents prepared by impregnation and wet mixing method of potassium carbonate on supports such as activated carbon and MgO (KACI30, KACP30, KMgI30, and KMgP30), were investigated in a fixed bed reactor ($CO_2$ absorption at 50-100° C. and regeneration at 150-400° C.). Total $CO_2$ capture capacities of KMgI30-500 and KMgP30-500 were 178.6 and 197.6 mg $CO_2$/g sorbent, respectively, in the presence of 11 vol % $H_2O$ even at 50° C. The large amount of $CO_2$ capture capacity of KMgP30-500 and KMgI30-500 could be explained by the fact that MgO itself, as well as $K_2CO_3$, could absorb $CO_2$ in the presence of water vapor even at low temperatures. In particular, water vapor plays an important role in the $CO_2$ absorption of MgO and KMgI30-500 even at low temperatures below 60° C., in marked contrast to MgO and CaO which can absorb $CO_2$ at high temperatures. The $CO_2$ capture capacity of the KMgI30-300 sorbent, however, was less than that of KMgI30-500 due to the formation of $Mg(OH)_2$ which did not absorb $CO_2$. MgO based-sorbents promoted with $K_2CO_3$ after $CO_2$ absorption formed new structures such as $K_2Mg(CO_3)_2$ and $K_2Mg(CO_3)_2$.4($H_2O$), unlike KACI30 which showed only the $KHCO_3$ crystal structure. The new Mg-based sorbents promoted with $K_2CO_3$ showed excellent characteristics in that it could satisfy a large amount of $CO_2$ absorption at low temperatures, a high $CO_2$ absorption rate, and fast and complete regeneration.

Shigemoto et al in Energy Fuels, 2006, 20 (2), pp 721-726 discuss the material balance and energy consumption for $CO_2$ recovery from moist flue gas employing $K_2CO_3$-on-Activated Carbon and its evaluation for practical adaptation. Potassium carbonate supported on an activated carbon has been proposed as an efficient sorbent to recover $CO_2$ from moist flue gases. As a characteristic of the present $CO_2$ sorption process, which can be described as $K_2CO_3.1.5H_2O+CO_2=2KHCO_3+0.5H_2O$, moisture in the feed gases had no influence on the $CO_2$ sorption. By the temperature-swing operation of a fixed-bed, the $CO_2$ recovery was achieved as follows: carbon dioxide in moist flue gases at around 363 K was sorbed by the $K_2CO_3$ sorbent, followed by steam flushing at 433 K to release the $CO_2$, and then cooling the sorbent for the next $CO_2$ sorption. In the present study employing a bench-scale apparatus, the material ($CO_2$ and $H_2O$) balances, together with those of heat during each step, were measured to elucidate the $CO_2$ sorption/release and the cooling behaviors. To evaluate the practical adaptability of this process, the heat consumption for the $CO_2$ recovery on a commercial-scale was estimated. When compared with that for other processes such as the conventional amine process, it provided a remarkable energy-conservative effect. The cost for the $CO_2$ recovery by $K_2CO_3$-on-activated carbon is also discussed.

SUMMARY OF THE INVENTION

Prior art does not disclose parameters of support material for alkali carbonates such as $K_2CO_3$ which are optimal for $CO_2$ capture from air. It is thus one object of the present invention to propose improved materials for the direct capture of carbon dioxide from atmospheric air as well as uses thereof.

According to a first aspect of the present invention a method for making a particulate activated carbon material for capturing $CO_2$ from air is proposed, wherein the particulate activated carbon is impregnated with at least one alkali carbonate salt selected from the group consisting of: $K_2CO_3$, $Li_2CO_3$, $Na_2CO_3$ as well as mixed salts thereof.

According to the proposed method, at least one alkali carbonate salt selected from the group consisting of: $K_2CO_3$, $Li_2CO_3$, $Na_2CO_3$ as well as mixed salts thereof is dissolved in a solvent, and, at the same time or following dissolution of the alkali carbonate salt, pristine particulate activated carbon, if need be after drying and/or purification, preferably non-oxidized, having a specific surface area, determined using nitrogen adsorption methods as described in ISO 15901-2 and ISO 15901-3 and according to the t-plot method, of at least 80 m2/g in the pore size range of more than 2 nm to at most 50 nm, is added to form a suspension, and wherein subsequently at least the solid fraction is isolated and/or dried by evaporation to obtain the impregnated particulate activated carbon.

Activated carbon is available in a large variety of forms according to the raw material from which it is obtained, according to the process used for its activation, and according to the final form that is given to the final product. In particular activated carbon is used in different applications according to the specific pore structure characterizing its internal space. We have investigated the correlation between the pore structure of activated carbon and the efficacy of the activated carbon within a given formulation with alkali carbonate salt, in particular with $K_2CO_3$, in the process of direct $CO_2$ capture from air. We can show that for activated carbon supports impregnated with alkali carbonate salt, in particular $K_2CO_3$, the $CO_2$ adsorption capacities from ambient air increases with increasing mesopore surface. In particular activated carbons having mesopore surfaces above 80 m2/g are especially apt as formulation ingredient.

The mesopore range is preferably 80-600 m2/g, and most preferably 80-400 m2 g, for the mesopore surface of the pristine activated carbon ingredient used in the formulation of the sorbent.

According to a first preferred embodiment of the method, the solvent is water, preferably deionized water.

Further preferably the concentration of the alkali carbonate salt is 1-8 mmol (total) alkali carbonate salt per ml solvent (e.g. water), preferably 1.5-4.5 mmol/ml solvent (water).

Preferably the pristine, preferably non-oxidized, particulate activated carbon is added to the solution under stirring.

Preferably the solvent is held at least for a certain amount of impregnation time, preferably over the full impregnation time, at a temperature in the range of 5-40° C., most preferably at a temperature in the range of 20-30° C., and/or the impregnation is carried out for a time span in the range of 30 minutes-100 hours, most preferably in the range of 2-40 h or 2.5-3 h or 6 hours-40 hours, and wherein subsequently at least the solid fraction is isolated and/or dried by evaporation, preferably vacuum evaporation.

Preferably the pristine particulate activated carbon support has a pore volume of at least 0.1 cm3/g and preferably at most of 1.5 cm3/g in the pore size range more than 2 nm to at most 50 nm and/or a specific surface area of 80-600 m2/g, preferably 80-400 m2/g in the pore size range of more than 2 nm to at most 50 nm, in each case determined using nitrogen adsorption methods according to ISO 15901-2 and ISO 15901-3 and according to the t-plot method.

To obtain a good sorbent it is important that the alkali carbonate salt ($K_2CO_3$) solution enters the pores of the support and infiltrates a large internal surface area. Capillary forces can be assumed to be a major driving force for this process. However, before the infiltration the pores are usually filled with air that needs to be replaced and that takes time to diffuse out of the porous support. Usually, rather long soaking times >12 h are used for the impregnation of activated carbon with alkali carbonate salt, e.g. $K_2CO_3$. The infiltration can be accelerated by the application of vacuum to remove the entrapped air followed by a return to atmospheric pressure to push the solution into the pores.

E.g. the application of a vacuum of 100 mbar for 2 times 5 min followed by a return to ambient pressure at the beginning of a 3 h impregnation period allowed improving the $CO_2$-adsorption capacity of the sorbent by a factor of 2.4 for a 180-min adsorption experiment.

Therefore according to a further preferred method the suspension is subjected to at least one time period with reduced pressure, preferably a vacuum of at most 300 mbar, preferably at most 200 mbar, most preferably in the range of 10-150 mbar, wherein that reduced pressure time period is at least 60 seconds, preferably at least 2 minutes, most preferably 3-20 or 5-10 minutes, and wherein before isolation of the impregnated particulate activated carbon the suspension is returned to ambient pressure for a time period of at least 60 seconds, wherein preferably at least two such cycles including a time period of reduced pressure of at least 60 seconds, preferably of at least 2 min, and a following time period of at least 60 seconds, preferably of at least 2 min, of ambient pressure are carried out, and wherein further preferably the total impregnation period before isolation is in the range of 2-5 hours, preferably in the range of 2.5-3.5 hours.

According to another aspect of the present invention it relates to impregnated particulate activated carbon, preferably obtained or obtainable using the method as described above. Herein it was found that activated carbon (AC) supports featuring a large share of pore volume and/or pore surface in the pore size range of 2-50 nm (mesoporous range) and preferably 50-1'000 nm (small macroporous range) are especially feasible support materials. Activated carbon materials have been studied as supports for $K_2CO_3$ modification, however, the importance of mesoporosity for $CO_2$ capture from air has not been disclosed. Mesoporosity has been described in the prior art in the context of alumina supports, however, alumina based $K_2CO_3$ sorbents require higher regeneration temperature than carbon based supports and are thus not useful for the $CO_2$ capture from air process described herein. The alumina surface together with $K_2CO_3$ forms mixed salts, e.g. $KAl(CO_3)^{2-}(OH)^-_2$, resulting in different reaction mechanisms with $CO_2$ in turn requiring a higher regeneration temperature in comparison to $K_2CO_3$ as such. In contrary, the surface of activated carbons is largely graphite, which does not react chemically with $K_2CO_3$ and acts as a chemically neutral carrier. The findings herein are not limited to $K_2CO_3$ but do also apply to the named other alkali metal salts, i.e. $Na_2CO_3$, $Li_2CO_3$, as well as mixed forms thereof such as $NaKCO_3$.

More specifically, the present invention relates to a particulate activated carbon material for capturing $CO_2$ from air, which is impregnated with at least one alkali carbonate salt selected from the group consisting of: $K_2CO_3$, $Li_2CO_3$, $Na_2CO_3$ as well as mixed salts thereof, preferably obtained or obtainable using the method as described above.

The impregnated particulate activated carbon has, according to one aspect of the present invention and determined using nitrogen adsorption methods as detailed in the experimental section and as described in ISO 15901-2 and ISO 15901 and according to the QSDFT calculation scheme, a pore volume of at least 0.10 $cm^3/g$ for pore sizes of at least 5 nm and a pore volume of at most 0.30 $cm^3/g$ for pore sizes of less than 5 nm.

The impregnated particulate activated carbon has, according to another alternative or cumulative aspect of the present invention, the feature that the particulate activated carbon is impregnated with a mixture of at least two different alkali carbonate salts selected from the group consisting of: $K_2CO_3$, $Li_2CO_3$, $Na_2CO_3$. As detailed and shown in the experimental section surprisingly the high proportion of mesopores and small macropores compared with micropores leads to a particularly efficient carbon dioxide capture property of the particulate activated carbon material. Furthermore in contrast to silica or alumina support materials, the essentially inert activated carbon carrier allows for lower temperatures and/or less vacuum during the desorption in the corresponding cycles.

As detailed and shown in the experimental section further surprisingly the carbon dioxide capture property of the $AC/K_2CO_3$ sorbent material tend to increase with the increase of the mesopore surface and volume, while they tend to decrease with the increase of the micropore surface and volume, where the pore surface and the pore volume are measured by nitrogen adsorption. Furthermore in contrast to silica or alumina support materials, the essentially inert activated carbon carrier allows for lower temperatures and/or less vacuum during desorption in the corresponding cycles.

As also detailed and shown in the experimental section surprisingly a mixture of at least two different alkali carbonate salts leads to a particularly efficient carbon dioxide capture property of the particulate activated carbon material increasing capture efficiency and reducing the desorption temperature and in such reducing the energy consumption and increasing capture efficiency.

According to a preferred embodiment the particulate activated carbon is impregnated with a mixture of at least two different alkali carbonate salts selected from the group consisting of: $K_2CO_3$, $Li_2CO_3$, $Na_2CO_3$, and an alkali carbonate salt with the smallest weight proportion in the mixture is present in an amount of at least 5 weight %, preferably at least 10 weight %, in each case with respect to the total of the impregnating mixture of at least two alkali carbonate salts.

According to a another preferred embodiment the impregnating mixture of at least two alkali carbonate salts comprises at least $Na_2CO_3$, preferably said mixture comprising or consisting of $K_2CO_3$ as well as $Na_2CO_3$, preferably in a weight ratio of $K_2CO_3$ to $Na_2CO_3$ in the range of 95:5-5:95, more preferably in the range of 90:10-10:90, most preferably in the range of 60:40-90:10.

Alternatively the mixtures can be characterized by way of the molar proportion of the respective cations. According to this characterization, preferably the alkali cation with the smallest molar proportion with respect to all cations in the mixed salt is at least 2%, preferably at least 5%, more preferably at least 10%. For the specific situation of a mixed salt including or consisting of sodium and potassium, the molar proportion between Na and K is preferably in the range of 24.7-0.07, preferably in the range of 11.7-0.14, most preferably in the range of 1.30-0.07.

In relation with the above mentioned prior art the following:

The formulations of the sorbent materials discussed by Acar et al. are based on powderised and highly acid oxidized activated carbons and consequently different from the ones that are used herein. In fact the $CO_2$ capacity described by Acar et al. is above the theoretical capacity possible if carbonates are the only capture chemicals, indicating a different mechanism of carbon capture. Due to the low concentration of $CO_2$ in air, the practical utilization of a sorbent requires very high volume flows. The sorbent material described by Acar et al. is in the form of a powder expressly obtained from the crushing of pelletized carbon. According to Chen et al. (Chem et al. Powder technology 124 (2002) 127) for an exemplary 27 μm powder one can use a pressure drop coefficient of 125000 Pa·s/m2. Considering realistic conditions for the capture of $CO_2$ from air, therefore a velocity through the bed of 0.2 m/s and a pressure drop of 150 Pa, such sorbent would require a bed height of ca 6 mm, which would not be feasible for a technical implementation. On the other hand, given the above conditions feasible for the capturing of $CO_2$ from air, a packed bed of 20 mm thickness of the material proposed by Acar et al. would generate a pressure drop of 500 Pa, thus generating prohibitively high energy costs. The above arguments prove that the material proposed by Acar et al. is not apt for capturing $CO_2$ from ambient air. In fact, the authors claim that their task is obtaining materials that have a high capacity in terms of $CO_2$ adsorption in the additional presence of methane, but not for the capture of $CO_2$ from ambient air. The carbon capture device used by Acar et al. is a testing instrument (thermogravimetric analyzer), typically used in academic laboratories in order to investigate phenomena, and cannot be scaled up to actually capture $CO_2$ from air.

While the sorbent material used by Zhao et al. is an activated carbon impregnated with $K_2CO_3$ in order to capture $CO_2$ from air, the formulation herein comprises more specific properties of the activated carbon support, in particular the pore size distribution versus the total specific surface area as discussed in Zhao et al. The invention here shows that activated carbon materials may have a large specific surface area but still not be apt as base for the formulation of a carbon capture composite material. The invention herein is the identification of the physical properties that make a good sorbent material and the use of such properties to formulate a material that can work at increased efficiency as respect to current $K_2CO_3$ formulations. At $CO_2$ concentrations representative for capturing $CO_2$ from air, i.e. 400 ppmv or 4E-4 in the dimensionless form as in FIG. 3 shown in Zhao et al., the $CO_2$ capacity of the sorbent materials of Zhao et al. lie well below 0.25 mmol $CO_2$/g, where herein capacities well above 1 mmol $CO_2$/g are shown, indicating that the pore properties in Zhao et al. are not optimized for capturing $CO_2$ from air. The device used by Zhao et al. is a testing system rather than a carbon capture device. The purpose of a testing system is to verify a given property of the material rather than being a template for the operation of the materials in large scale.

The activated carbon sorbents used by Lee et al. (KACl30 and KACP30) show a high $CO_2$ total capacity (1.7 and 1.8 mmol/g) in a gas containing 1 vol % of $CO_2$ after an exposure of ca. two hours. Considering that the concentration of $CO_2$ in ambient air is 0.04 vol %, and that the reaction kinetic is first order and only depends on the $CO_2$ concentration, [Onishak et al, Kinetic of the reaction of $CO_2$ with solid $K_2CO_3$, in: 73rd National AIChE Meeting, Minneapolis, USA, 1972], the kinetic of the reaction for capturing $CO_2$ from ambient air using the material proposed by Lee et al. would be correspondingly reduced by almost two orders of magnitude, rendering the reaction prohibitively slow, showing that the materials in question were not suitable for direct capture of $CO_2$ from air. Here we show $CO_2$ capacities of above 1 mmol $CO_2$/g achieved after ca. six hours, hence, significantly faster than Lee et al.

Shigemoto et al show that the sorbent material formed by impregnation of activated carbon with $K_2CO_3$ has a breakthrough after ca 1 h of exposure to a gas containing ca 10% v/v $CO_2$. Considering that air has a concentration to $CO_2$ of ca 0.04% v/v and using the argument regarding reaction kinetics as shown above, then the breakthrough obtained if the material was used to capture $CO_2$ from ambient air would be longer by almost three orders of magnitude, due to the slower kinetics of $CO_2$ reaction, therefore rendering the material too slow in $CO_2$ capture from ambient air. In fact the authors have proposed the material for $CO_2$ capture from flue gas. This shows that the material developed by Shigemoto et al. is not apt for the application of direct $CO_2$ capture from air. Here we show $CO_2$ capacities of above 1 mmol $CO_2$/g achieved after six hours, hence, significantly faster than Shigemoto et al.

As detailed and shown in Example 3 further surprisingly the carbon dioxide capture property of the $AC/K_2CO_3$ sorbent material tends to increase with the increase of the mesopore volume, while they tend to decrease with the increase of the micropore volume. Furthermore in contrast to silica or alumina support materials, the essentially inert activated carbon carrier allows for lower temperatures and/or less vacuum during desorption in the corresponding cycles.

According to a first preferred embodiment, the alkali carbonate (e.g. $K_2CO_3$) impregnated particulate activated carbon has, determined using nitrogen absorption methods, as described in ISO 15901-2 and ISO 15901-3, and according to the QSDFT calculation scheme as detailed in Example 3, a pore volume of at least 0.04 cm$^3$/g, 0.05 cm$^3$/g or 0.1 cm³/g, preferably in the range of 0.05-2.2 or 0.1-2.2 or 0.2-1.5 cm³/g for pore sizes above 2 or above 5 nm or in the range of 2-50 or 5-50 nm.

According to another preferred embodiment, the alkali carbonate (e.g. $K_2CO_3$) impregnated particulate activated carbon has a pore volume of at least 0.05 cm³/g for pore sizes in the range of 50-1'000 nm, as determined using mercury porosimetry analysis as described in ISO 15901-1 and detailed in Example 6.

According to another preferred embodiment, the alkali carbonate (e.g. $K_2CO_3$) impregnated particulate activated carbon has a pore volume, determined as detailed in Example 3, of at most 0.4 or 0.25 cm³/g or 0.2 cm³/g or in the range of 0.05-0.2 cm³/g or 0.05-0.15 cm³/g for pore sizes of less than 2 or less than 5 nm.

According to another preferred embodiment, the alkali carbonate (e.g. $K_2CO_3$) impregnated particulate activated carbon has a pore surface of at least 20 m2/g or 35 m2/g, preferably in the range of 40-250 or 45-200 m2/g for pore sizes above 2 nm or in the range of 2-50 nm, determined using nitrogen adsorption methods as described in ISO 15901-2 and ISO 15901 and according to the QSDFT calculation scheme.

The $K_2CO_3$ impregnated particulate activated carbon preferably has, as detailed in Example 3, a pore surface of at least 20 m²/g, preferably in the range of 25-500 40-400 or or 50-400 m²/g for pore sizes of at least 2 nm or at least 5 nm or in the range of 2-50 or 5-50 nm.

The alkali carbonate (e.g. $K_2CO_3$) impregnated particulate activated carbon can have pore surface of at most 900 or 500 m²/g or in the range of 150-500 or 100-400 m²/g for pore sizes of less than 2 nm or less than 5 nm determined using methods as described in Example 3.

The impregnated particulate activated carbon preferably has a BET surface area determined according to ISO 9277 in the range of 100-800 m²/g, or of less than 1000 or less than 500 m²/g.

The alkali carbonate (e.g. $K_2CO_3$) impregnated particulate activated carbon in addition to that typically has a tapped density measured according to the method described in Example 2 in the range of 300-800 kg/m³, preferably in the range of 400-600 kg/m².

The impregnated particulate activated carbon can have a particle size (preferably expressed as D50 determined in accordance with ISO 9276-2 (2014)) in the range of 0.1-8 mm, preferably in the range of 0.2-4.5 mm, most preferably in the range of 0.5-1.5 mm and/or in the range of mesh (ASTM) 3-140, preferably 4-50.

The impregnated particulate activated carbon preferably contains at least 10% by weight of alkali carbonate (e.g. $K_2CO_3$), preferably at least 20% by weight, or at least 30% by weight, most preferably in the range of 25-45% by weight.

The impregnated particulate activated carbon according to the invention preferably has an average carbon dioxide capacity, at 30° C., 60% relative humidity and 450 ppmv carbon dioxide concentration in air or another gas or gas mixture after 1000 minutes adsorption of in the range of 0.5-5 mmol/g, preferably in the range of 1-2.5 mmol/g and/or after 180 minutes adsorption of in the range of 0.25-2 mmol/g, preferably in the range of 0.5-2 mmol/g or in the range of 0.6-1.5 mmol/g.

According to another preferred embodiment of the invention, the AC/alkali carbonate sorbent material is formulated using activated carbons having at least 0.1 cm³/g of mesopore pore volume, preferably up to 2.5 cm³/g or up to cm³/g, or in the range 0.1-3.5 cm³/g, and at least 80 m²/g of mesopore pore surface, preferably greater than 100 m²/g, measured using the method described in Example 11.

The particles of the impregnated particulate activated carbon are preferably essentially spherical, extruded rods, or pellets.

The present invention furthermore relates to a carbon dioxide capture device comprising a activated carbon-based material as detailed above, preferably in the form of at least one air permeable container comprising said impregnated particulate activated carbon in particulate form, most preferably in the form of a multitude of layers of such containers arranged in a stack.

Such a carbon dioxide capture device preferably comprises a housing in which the at least one air permeable container containing the particles of the impregnated particulate activated carbon is located, wherein the housing has at least one opening for allowing in and/or allowing out atmospheric air for adsorption and closing lids for said at least one opening to close the housing as well as means for applying a vacuum and/or temperature change for release of the adsorbed carbon dioxide as well as means for removal of said adsorbed carbon dioxide from the housing and for collecting and/or further concentrating and/or condensing the carbon dioxide.

Furthermore the present invention relates to a method for making an impregnated particulate activated carbon material as detailed above, wherein preferably in a first step $K_2CO_3$ is dissolved in a solvent, preferably water, most preferably deionized water, wherein preferably the concentration is 1-8 mmol $K_2CO_3$/ml water, preferably 1.5-4.5 mmol $K_2CO_3$/ml water, and wherein particulate activated carbon, if need be after drying and/or purification, is added to the solution, under stirring, preferably at a temperature in the range of 5-40° C., most preferably at a temperature in the range of 20-30° C., and/or for a time span in the range of 30 minutes-100 hours, most preferably in the range of 6 hours-40 hours, and wherein subsequently at least the solid fraction is isolated and/or dried by (vacuum) evaporation.

The present invention also relates to the use of an impregnated particulate activated carbon material as detailed above, preferably using a carbon dioxide capture device as detailed above, for capturing carbon dioxide from atmospheric air, preferably in a cyclic process.

The present invention furthermore relates to a method for capturing carbon dioxide from atmospheric air using the impregnated particulate activated carbon as detailed above, preferably a carbon dioxide capture device as detailed above, wherein a temperature/vacuum swing cycle, with or without steam injected, is used for adsorption and desorption of the carbon dioxide.

In such a method preferably at least a part of the desorption of $CO_2$ is performed at a pressure in the range of 50-400 $mbar_{abs}$ preferably of 100-300 $mbar_{abs}$ and at a temperature in the range of 80-150° C. or at least a part of the desorption of $CO_2$ is performed at a pressure in the range of 50-400 $mbar_{abs}$ preferably of 100-300 $mbar_{abs}$ and at a temperature of 35-80° C., preferably of 45-80° C. and another part of the desorption of $CO_2$ is performed at a temperature in the range of 80-150° C., preferably of 90-135° C.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1A:
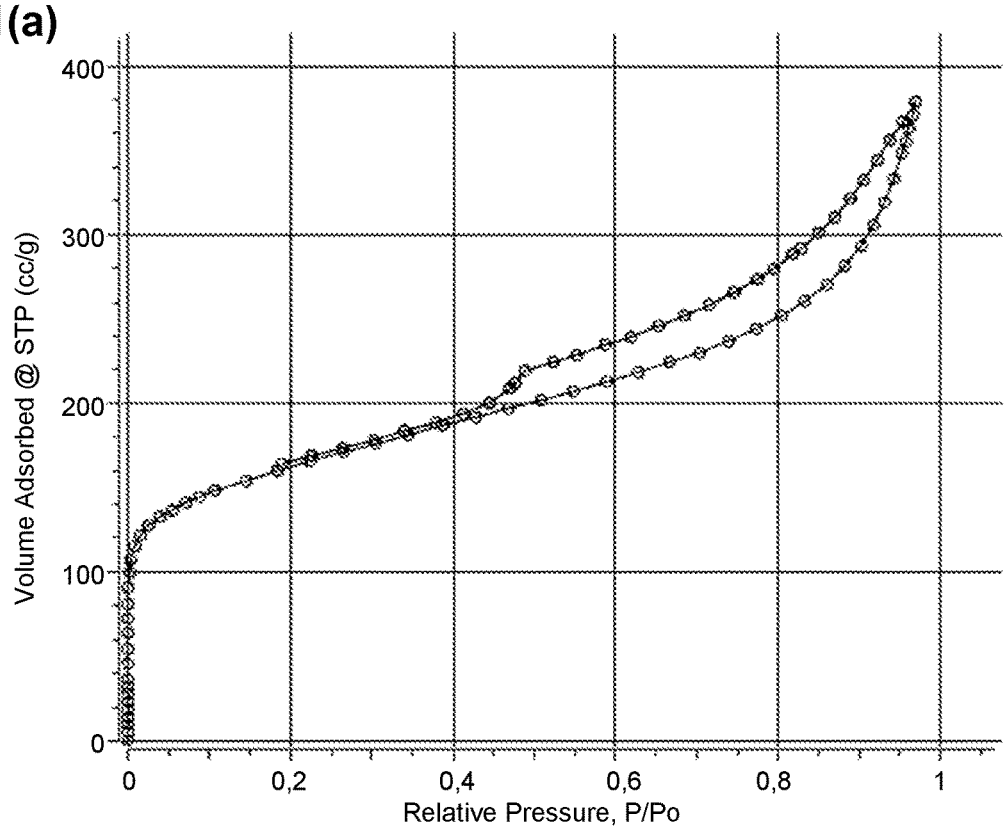
FIGS. 1(a)-1(d) show $N_2$ adsorption isotherms for (a) AC mesh 20-40-, (b) AC mesh 4-12, (c) AC extruded, (d) $K_2CO_3$/AC V (mesh 20-40)
Figure 1B:
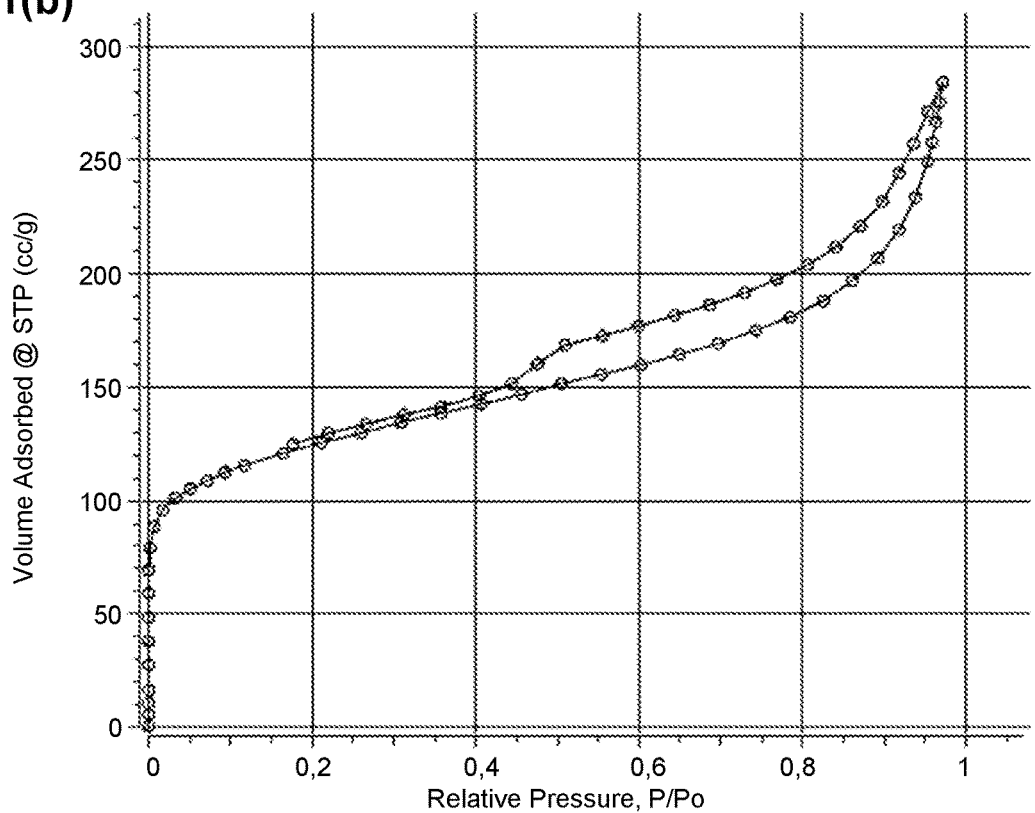
Figure 1C:
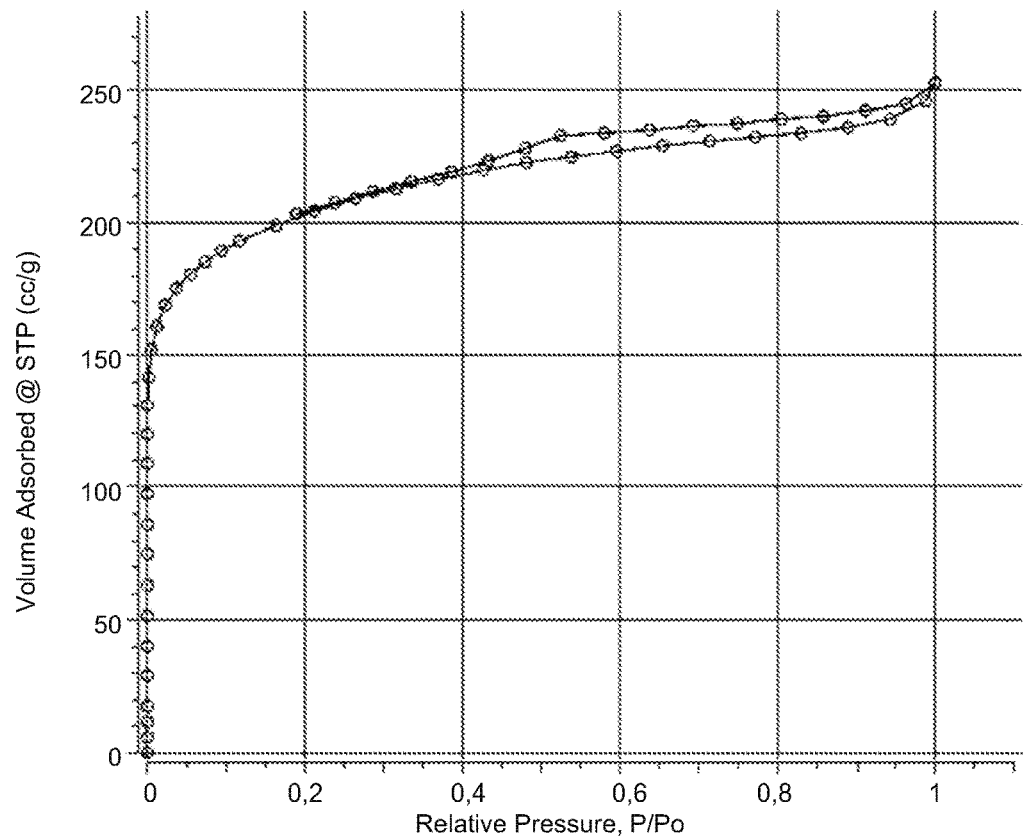
Figure 1D:
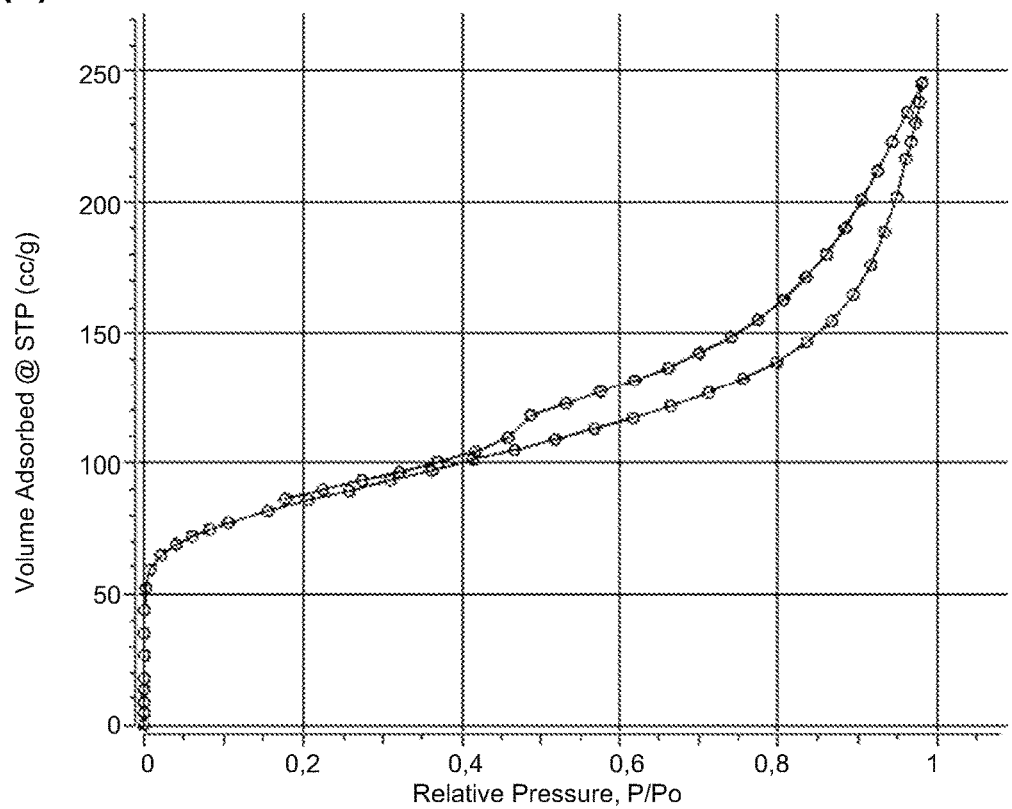

Example 1. Synthesis of Different Activated Carbon/$K_2CO_3$ Sorbents

Utilized chemicals and materials:
Granular activated carbon, mesh size 20-40 (0.841-0.420 mm) CAS no.: 7440-44-0, Sigma Aldrich, DARCO®;
Granular activated carbon mesh size 4-12 (4.76-1.68 mm), CAS no.: 7440-44-0, DARCO®;
Extruded activated carbon 3 mm, CAS no.: 7440-44-0, Cabotcorp, Norit®;
$K_2CO_3$, CAS no.: 584-08-7, Sigma Aldrich Potassium Cabonate Anhydrous.

Description of the Synthesis of Particulate Activated Carbon/$K_2CO_3$ Sorbents:

$K_2CO_3$/AC 20-40 Mesh

Method 1: (Batch IV) $K_2CO_3$ (10.31 g, 0.075 mol) was added to deionized water (30 cm³). Granular, mesh 20-40 activated carbon (20.07 g) was added to the mixture while stirring. The mixture was left stirring at room temperature for 24 hours. The mixture was placed on a tray in an oven and heated to 105° C. The material was dried at 105° C. for 3 hours.

Method 2: $K_2CO_3$ (10.0355 g) was added to 60 cm³ of deionized water. Activated carbon 20-40 mesh (20.0577 g) was added to the solution. The mixture was placed in a rotary evaporator and was mixed at room temperature for 24 hours. The water was removed at 60° C.

$K_2CO_3$/AC (Batches V, VII, VIII, IX, XI) were all prepared in the same way as $K_2CO_3$/AC IV. Below in Table 1 are the exact amounts of $K_2CO_3$ and granular mesh 20-40 activated carbon that were used. $K_2CO_3$/AC IV, V and VII were produced with activated carbon taken from one supplier batch and $K_2CO_3$ AC VIII, IX, and XI were taken from a second supplier batch in order to check reproducibility.

TABLE 1

Mass of $K_2CO_3$ and AC used in the synthesis of the composite sorbent

| Batch | $K_2CO_3$ (g) | 20-40 mesh activated carbon (g) |
|---|---|---|
| IV | 10.31 | 20.07 |
| V | 10.19 | 20.14 |
| VII | 10.13 | 20.44 |
| VIII | 10.12 | 20.07 |
| IX | 10.03 | 20.09 |
| XI | 10.02 | 20.09 |

$K_2CO_3$/AC 4-12 mesh: $K_2CO_3$ (10.05 g, 0.073 mol) was added to deionized water (30 cm³). Granular, mesh 4-12 activated carbon (20.01 g) was added to the mixture while stirring. The mixture was left stirring at room temperature for 24 hours. The mixture was placed on a tray in an oven and heated to 105° C. The material was dried at 105° C. for 3 hours.

$K_2CO_3$/AC Extruded AC:

Method 1: $K_2CO_3$ (10.08 g, 0.073 mol) was dissolved in 30 cm³ of deionized water. Carbon rods (20.13 g) were placed in a flat beaker and the aqueous $K_2CO_3$ solution was pipetted onto it. The activated carbon was left to soak for 24 hours at room temperature and was then dried in the oven for two hours at 150° C.

Method 2: $K_2CO_3$ (10.10 g, 0.073 mol) was dissolved in 30 cm³ of deionized water. Activated carbon rods (19.99 g) were added to the solution. The rods were left to soak for 24 hours at room temperature. The mixture was filtered using gravity filtration and then dried in the oven at 150° C. for two hours. 10 cm³ of the 24 cm³ of filtrate was dropped onto the dried activated carbon. The mixture was left at room temperature for a further 24 hours and was then dried in the oven at 150° C. for two hours.

Example 2. Measurement of Tapped Density of Adsorbents

Method for the tapped density measurements:
1. A graduated cylinder was placed on a PCE (Mettler Toledo) analytical scale and tarred.

2. The graduated cylinder was filled with sorbent particles using a funnel.
3. As the cylinder was filled, it was tapped manually with a spatula in order to compact the material. The cylinder was tapped between 10 and 20 times by tapping different parts of the cylinder, including the base.
4. Once the cylinder was filled with 5 cm³ of material, the weight (g) was recorded.
5. The density was calculated by dividing the weight, w by the volume, V of 5 ml, d=w/V. The error associated with the measurement is ±0.01 g/ml.

Results for tapped density measurements:

TABLE 2

Tapped densities of AC pure and loaded with $K_2CO_3$

| | AC granular 20-40 mesh batch 1/ kg m⁻³ | AC granular 20-40 mesh batch 2/ kg m⁻³ | AC granular 4-12 mesh/ kg m⁻³ |
|---|---|---|---|
| Pure AC | — | 403 ± 10 | 432 ± 10 |
| AC loaded with 33 w % $K_2CO_3$ | 558 ± 10 | 592 ± 10 | 539 ± 10 |

Example 3. Pore Size, Pore Volume and Specific Surface Area of Adsorbents

Method for the specific surface area measurements of the sorbents:

Nitrogen adsorption measurements were performed at 77 K on a Quantachrome Autosorb iQ and post-processed using ASiQWin. The mass of the sample used was 100 mg, the samples were degassed at 130° C. under vacuum for four hours before measurement.

BET (Brunauer, Emmett and Teller) surface area analysis was done using the method described in ISO 9277.

Method for the pore volume and pore size calculations:

The experimental characterization of micro- and macropores is described in ISO 15901-2 and ISO 15901-3. Micropore and mesopore volume and surface distributions were calculated using the QSDFT method (quenched solid density functional theory) as referred to in Iupac Technical Report, Pure Appl. Chem. 2015; 87(9-10): 1051-1069.

The applied calculation tools were:
"QSDFT—$N_2$—carbon adsorption branch kernel at 77 K based on a slit-pore model (pore diameter <2 nm) and cylindrical pore model (pore diameter >2 nm)" which has an upper calculation limit for a pore size of 33 nm.
"$N_2$ @ 77K on carbon (slit/cyl./spher. pore)" which contains in comparison to the kernel above additionally a spherical pore model for pore sizes above 5 nm and in such allows calculations up to 50 nm.

The adsorption curves were used instead of the desorption curves due to tensile-strength effects.

Results for the specific surface area measurements are given in FIG. 1.

Figure 2:
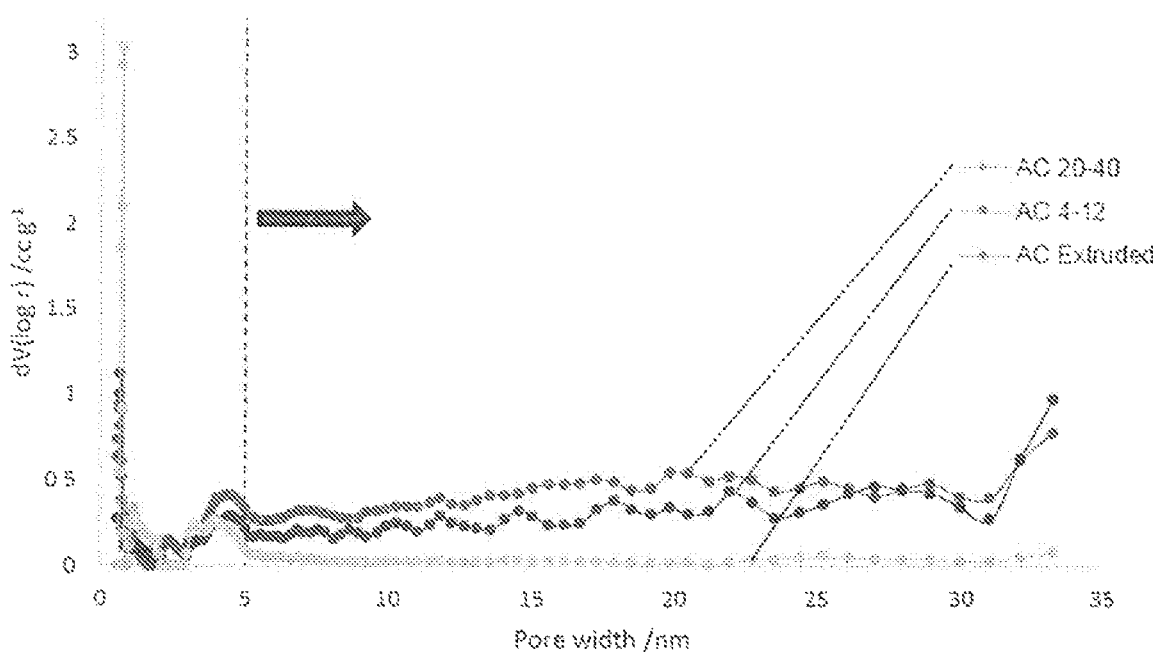
FIG. 2 shows the pore size distributions for AC mesh 20-40 batch 1, AC mesh 4-12, AC extruded.

According to IUPAC definitions micropores are defined as being <2 nm in diameter, mesopores are defined as being 2<x<50 nm in diameter and macropores are >50 nm. From FIG. 1 (a) it can be seen that AC mesh 20-40 has both micro- and mesopores. The knee at low partial pressures shows strong adsorbate-adsorbent interactions typical of micropores. The hysteresis indicates the presence of mesopores. $K_2CO_3$/AC V in FIG. 1 (d) has the same adsorption isotherm with a lower volume, which indicates that both micro- and mesopores were filled with $K_2CO_3$. The AC mesh 4-12 also has a similar isotherm showing that this material too has micro- and mesopores. From FIG. 1 (c) it can be seen that the extruded AC has predominantly micropores and few mesopores with small size featuring a typical type 1 adsorption isotherm. From the pore size distribution analysis below (see FIG. 2) one can see that the extruded AC has predominantly pores in the size range of <2 nm or <5 nm of pore diameter.

The specific surface areas are summarized in Table 3 below:

TABLE 3

BET surface areas of pristine AC supports and $K_2CO_3$/AC V

| | AC 20-40 mesh batch 1/ m² g⁻¹ | AC 20-40 mesh batch 2/ m² g⁻¹ | AC 4-12 mesh m² g⁻¹ | AC extruded/ m² g⁻¹ |
|---|---|---|---|---|
| Pure AC | 585 | 650 | 448 | 757 |
| AC loaded with 33 w % $K_2CO_3$ | 304 | — | — | — |

The AC extruded has the highest surface area as this material has predominantly micropores and small mesopores below 5 nm or below 2 nm. AC mesh 4-12 has the lowest surface area indicating that it presumably has the largest pore sizes. As shown below the extruded AC has the lowest $CO_2$ capacity for $CO_2$ capture from air and AC mesh 4-12 has the highest, so that the AC support with the lowest specific surface area performs best. This is contrary to prior art, where it is largely claimed that the specific surface area of the support needs to be maximized, but no indications with respect to pore size are given.

The surface area for the two AC mesh 20-40 supplier batches differ by 10%. The fact that the surface area in batch 1 is lower than that of batch 2 could indicate that it has larger pore sizes, e.g. more pore volume in size above 30 nm.

The results for the pore volume and pore size calculations using the two different kernels are shown in Table 4a and Table 4b below:

TABLE 4a

Surface area and pore volumes for micropores and mesopores as determined by QSDFT calculations with kernel "QSDFT - N2 - carbon adsorption branch kernel at 77K based on a slit-pore model (pore diameter < 2 nm) and cylindrical pore model (pore diameter > 2 nm)"

| | Micropores | | Mesopores | |
|---|---|---|---|---|
| Sample ID | Micropore surface area/ m² g⁻¹ | Micropore volume/ cm³ g⁻¹ | Mesopore surface area/ m² g⁻¹ | Mesopore volume/ cm³ g⁻¹ |
| AC mesh 20-40 batch 1 | 375 | 0.144 | 210 | 0.408 |
| AC mesh 20-40 batch 2 | 402 | 0.163 | 248 | 0.498 |
| AC mesh 4-12 | 315 | 0.130 | 133 | 0.274 |
| AC extruded | 660 | 0.270 | 97 | 0.076 |
| $K_2CO_3$/AC V | 188 | 0.073 | 116 | 0.258 |

TABLE 4b

Surface area and pore volumes for pore sizes as determined by QSDFT calculations with kernel "N2 @ 77K on carbon (slit/cyl./spher. pore)"

| Sample ID | Micropores | | Mesopores | |
|---|---|---|---|---|
| | Micropore surface area/ m$^2$ g$^{-1}$ | Micropore volume/ cm$^3$ g$^{-1}$ | Mesopore surface area/ m$^2$ g$^{-1}$ | Mesopore volume/ cm$^3$ g$^{-1}$ |
| AC mesh 20-40 batch 1 | 381 | 0.146 | 191 | 0.383 |
| AC mesh 20-40 batch 2 | 401 | 0.163 | 215 | 0.471 |
| AC mesh 4-12 | 304 | 0.121 | 126 | 0.261 |
| AC extruded | 661 | 0.271 | 59 | 0.073 |
| K$_2$CO$_3$/AC V | 188 | 0.073 | 299 | 0.243 |

Analysis of Table 4a and Table 4b shows that both kernels yielded comparable results which is why in the following analysis is limited to results obtained with kernel "QSDFT—N$_2$—carbon adsorption branch kernel at 77 K based on a slit-pore model (pore diameter <2 nm) and cylindrical pore model (pore diameter >2 nm)" (except for BJH calculation below).

By comparing the pore volume of pristine AC mesh 20-40 batch 1 and K$_2$CO$_3$/AC V it can be seen that roughly 50% of the micropore volume was filled with K$_2$CO$_3$ as well as around 35% of the mesopore volume, hence, both pore regimes contribute to K$_2$CO$_3$ modification, as further explained below. Due to the much higher specific surface area of the micropore volume (375 m$^2$/g) than the mesopore volume (210 m$^2$/g) in AC mesh 20-40 batch 1 it can be assumed that the K$_2$CO$_3$ filling is distributed on a bigger surface in the micropores and in such offering higher mass transfer area compared to the mesopore volume. However, as described below especially the pore volume available at pore size above 5 nm, hence, medium to large size mesopores as well as small macropores, contribute to a favourable K$_2$CO$_3$ modified sorbent for CO$_2$ capture from air. This finding has not been described in prior art, rather the opposite.

As described further below K$_2$CO$_3$/AC V (AC mesh 40-20 batch 1) and K$_2$CO$_3$/AC 4-12 mesh feature high CO$_2$ capacities where K$_2$CO$_3$/AC extruded shows very little capacity for CO$_2$ capture from air.

From the adsorption isotherms, specific surface area, pore volume and pore size distributions data (see FIG. 2) it can be seen that AC extruded is predominantly microporous and has few pores in the small range below 2 nm or below 5 nm. This support did not work for CO$_2$ capture from air and so it can be concluded that pore sizes >2 nm or >5 nm are needed to provide feasible supports for CO$_2$ capture from air.

Figure 3:
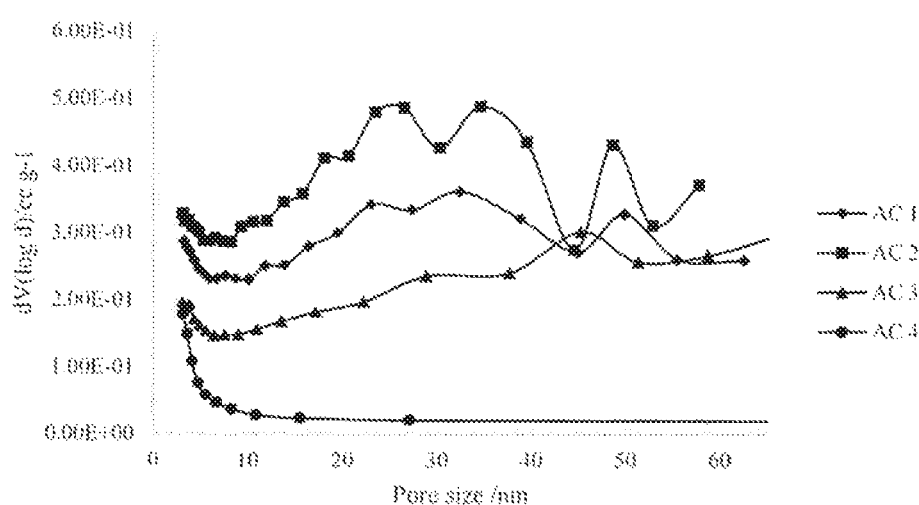
FIG. 3 shows a BJH plot for AC 1: AC mesh 20-40 batch 1, AC 2: AC mesh 20-40 batch 2, AC 3: AC mesh 4-12 and AC 4: AC extruded.
Figure 4:
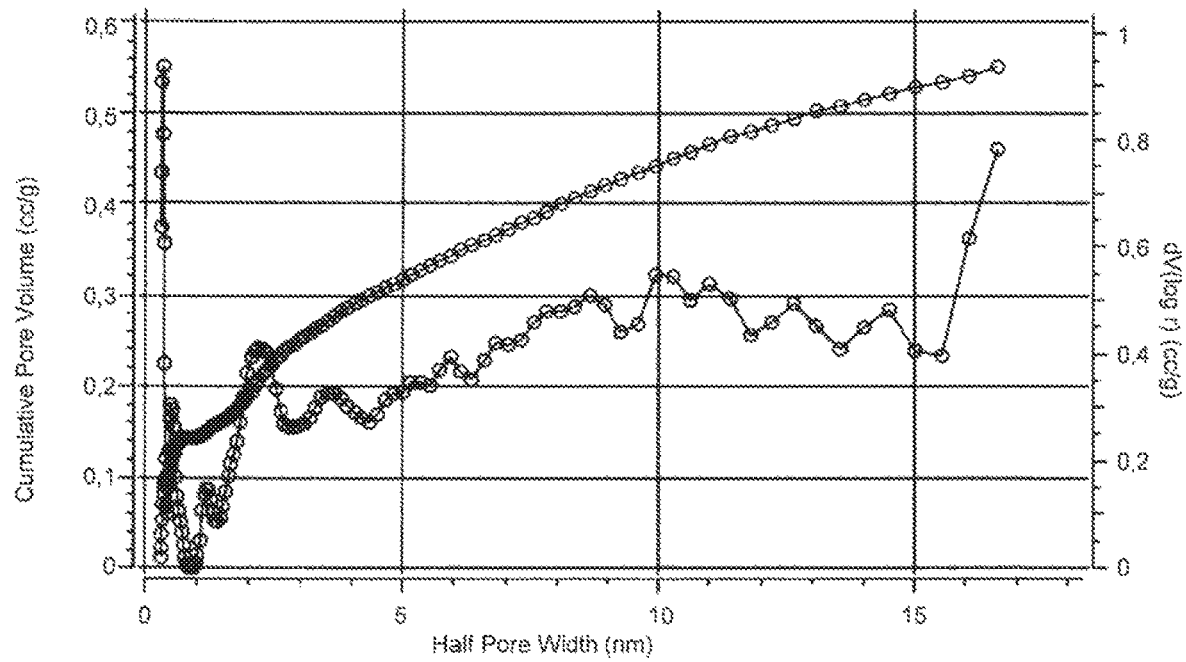
FIG. 4 shows pore size vs. pore volume for AC mesh 20-40 batch 1.
Figure 5:
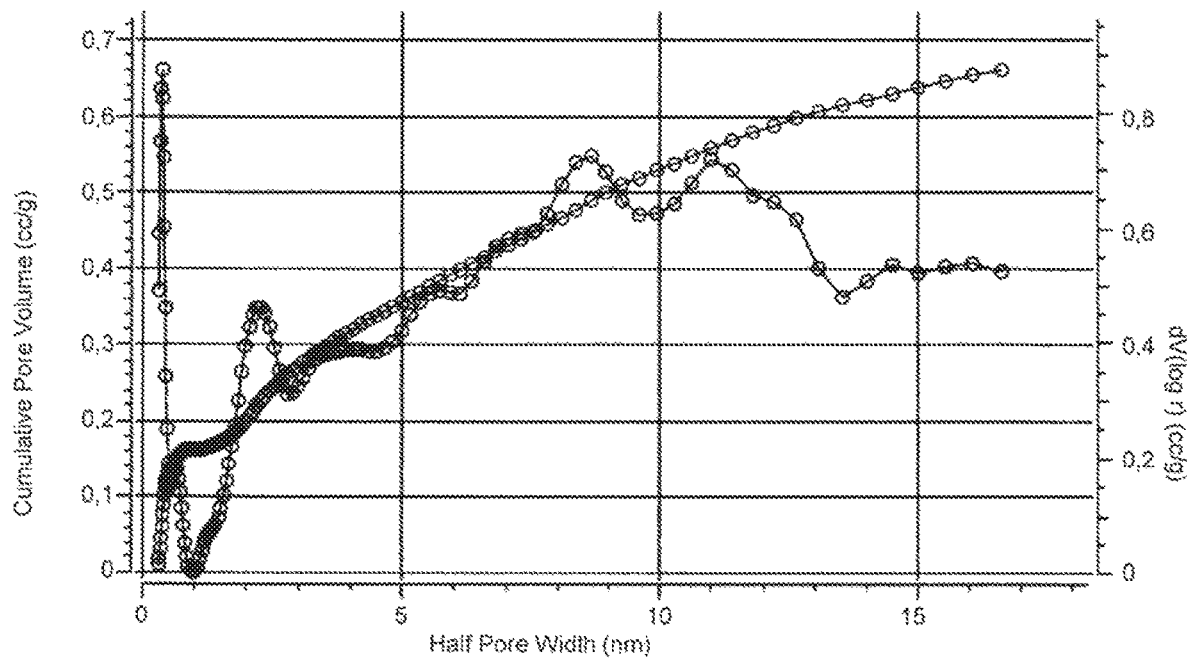
FIG. 5 shows pore size vs. pore volume for AC mesh 20-40 batch 2.
Figure 6:
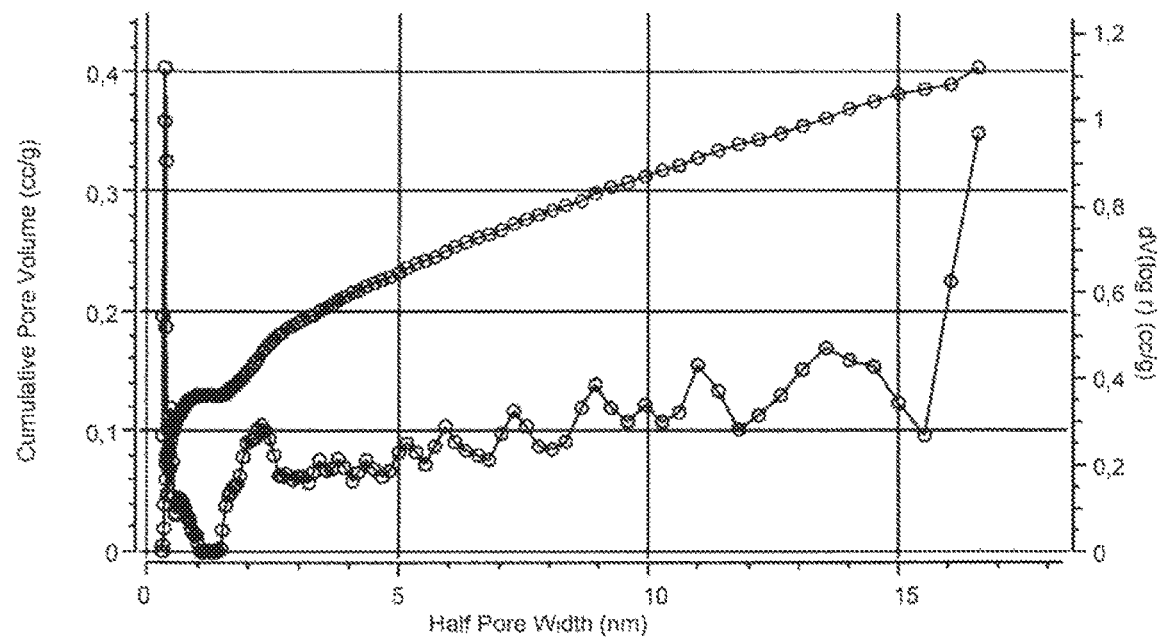
FIG. 6 shows pore size vs. pore volume for AC mesh 4-12.
Figure 7:
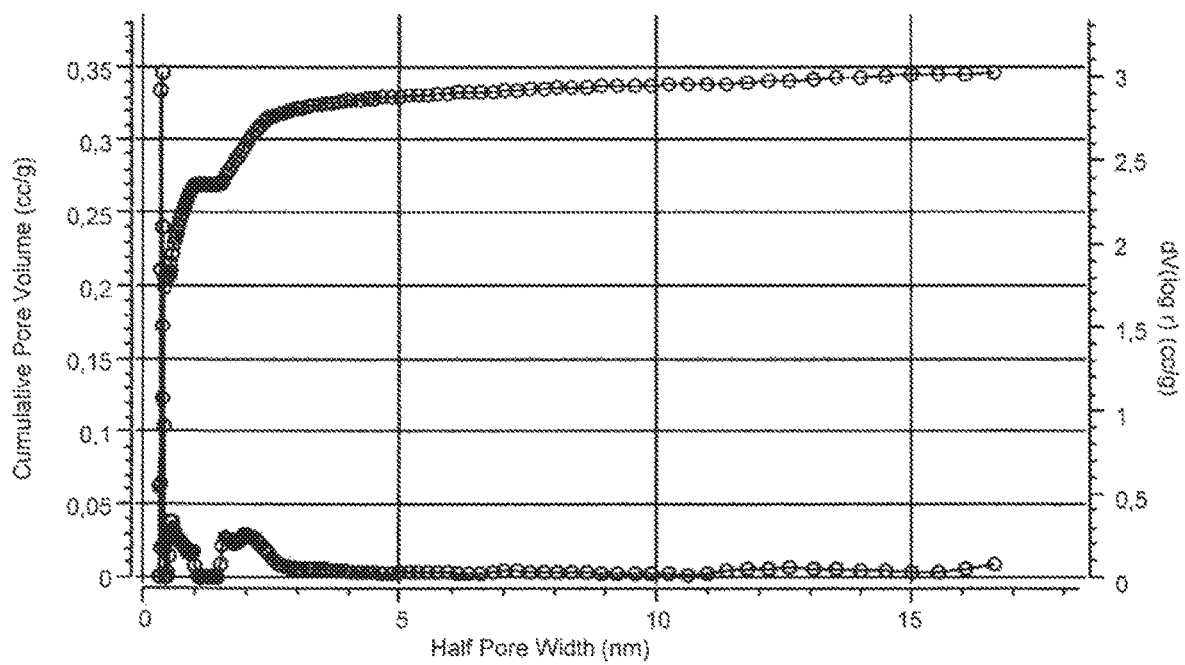
FIG. 7 shows pore size vs. pore volume for extruded AC.
Figure 8:
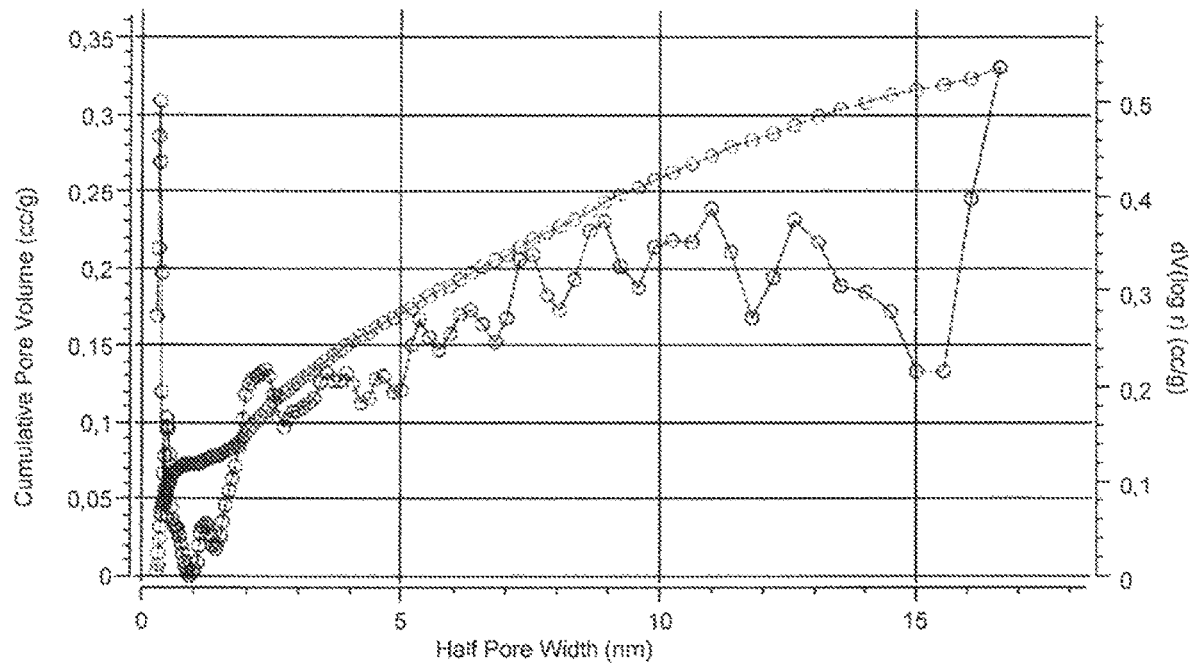
FIG. 8 shows pore size vs. pore volume for $K_2CO_3$/AC V.

In addition to the BET and DFT calculations BJH (Barrett-Joyner-Halenda) calculations were made. The comparisons for AC mesh 20-40 batch 1, AC mesh 20-40 batch 2, AC mesh 4-12 and AC extruded are shown in FIG. 3. It can be seen that AC mesh 20-40 batch 2 has the highest pore volume followed by AC mesh 20-40 batch 1 and then AC mesh 4-12. There seems to be a peak at approximately 35 nm for the materials AC mesh 20-40 batch 1 and mesh 20-40 batch 2. AC mesh 4-12 has a peak of pore volume around 45 nm. FIG. 3 seems to indicate that the best performing materials do have mesopores.

Figure 9:
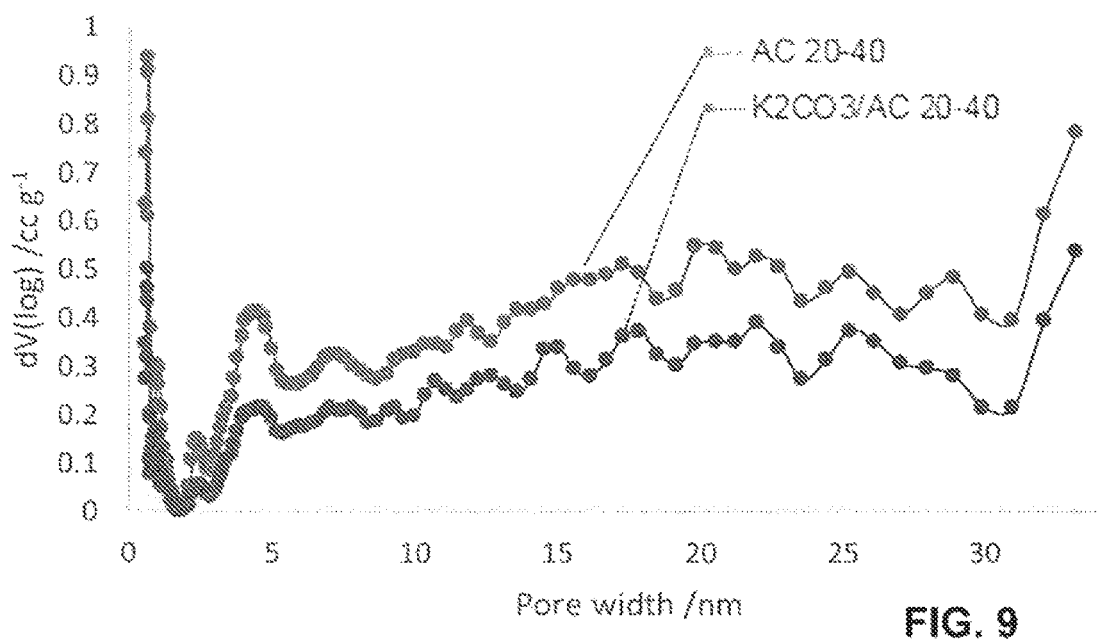
FIG. 9 shows pore size distributions for AC mesh 20-40 and $K_2CO_3$/AC mesh 20-40.

FIGS. 4-8 show the detailed measurement results of the cumulative pore volume versus the pore size (given as half pore width), and FIG. 9 gives the pore size distribution for the pristine AC mesh 20-40 batch 1 and the K$_2$CO$_3$/AC V.

From FIG. 9 it can be seen that the pores in the range 5<x<30 nm are all filled approximately equally with K$_2$CO$_3$. There isn't a specific range that seems to take up more K$_2$CO$_3$.

Example 4. CO$_2$ Adsorption/Desorption Capacities of Adsorbents

The method used to determine the CO$_2$ adsorption/desorption capacity was as follows:
1. The as synthesized material was weighed. It was placed on a tray and heated to 150° C. in a Binder natural convection oven.
2. The material was desorbed for 2 hours once the oven reached 150° C.
3. After two hours the oven was cooled and once a temperature of 80° C. was reached the material was removed and weighed.
4. 6 g of desorbed sample was filled into a cylinder with an inner diameter of 40 mm and a height of 40 mm and placed into a CO$_2$ adsorption/desorption device, where it was exposed to a flow of 2.0 NL/min of air at 30° C. containing 450 ppmv CO$_2$, having a relative humidity of 60% corresponding to a temperature of 30° C. for a duration of 1000 min. The amount of CO$_2$ adsorbed on the adsorbent was determined by integration of the signal of an infrared sensor measuring the CO$_2$ content of the air stream leaving the cylinder. After CO$_2$ adsorption the adsorbent was weighed again.

Figure 10:
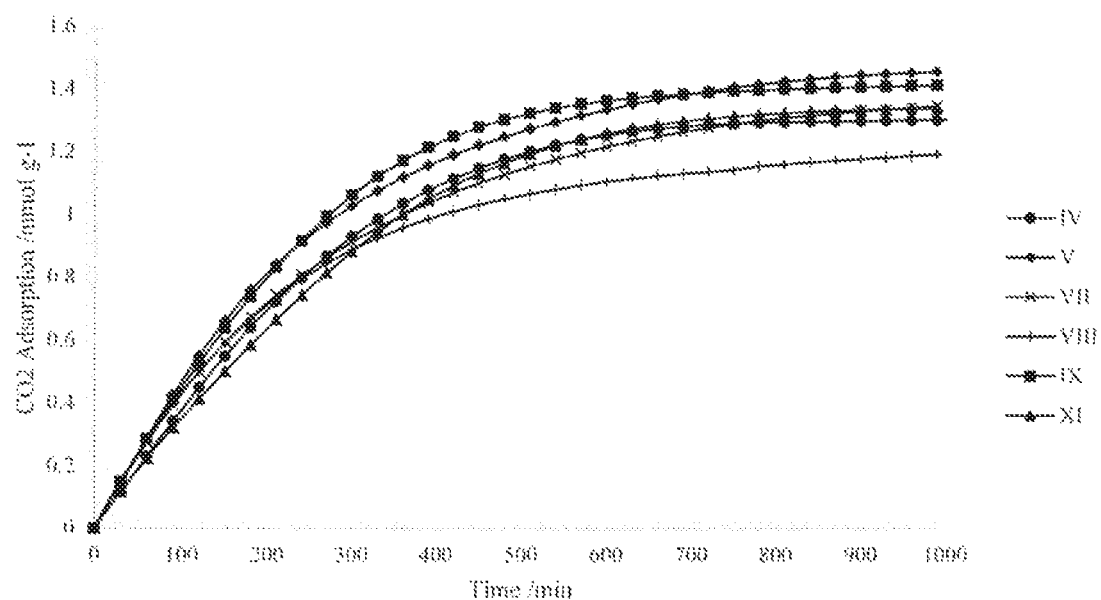
FIG. 10 shows $CO_2$ adsorption curves for samples $K_2CO_3$/AC IV, V, VII, VIII, IX, XI.
Figure 11:
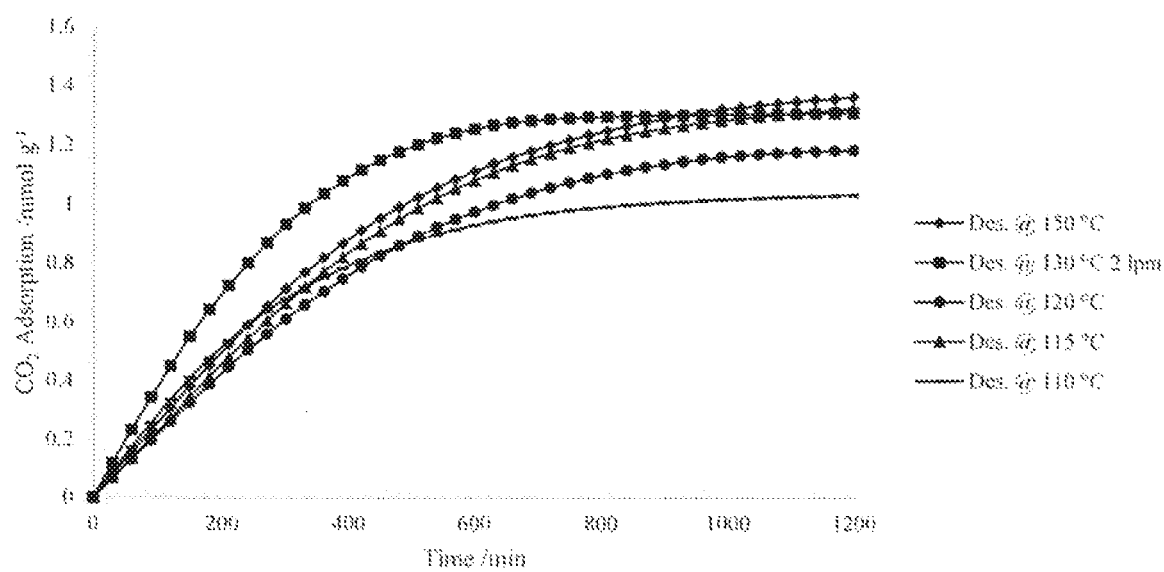
FIG. 11 shows $CO_2$ adsorption curves for $K_2CO_3$/AC IV after different desorption conditions.

The results of the CO$_2$ adsorption/desorption measurements are summarized in the FIGS. 10 and 11 and Table 5.

TABLE 5

CO$_2$ capacities after 1000 min. and 180 min. for different batches of K$_2$CO$_3$/AC

| | CO$_2$ capacity after 1000 min. adsorption/ mmol g$^{-1}$ | CO$_2$ capacity after 180 min. adsorption/ mmol g$^{-1}$ |
|---|---|---|
| AC mesh 20-40 batch 1 | | |
| IV | 1.350 | 0.641 |
| V | 1.528 | 0.760 |
| VII | 1.330 | 0.673 |
| AC mesh 20-40 batch 2 | | |
| VIII | 1.215 | 0.676 |
| IX | 1.382 | 0.739 |
| XI | 1.328 | 0.586 |
| Average | 1.4 ± 0.1 | 0.68 ± 0.06 |

The average CO$_2$ capacity at 30° C., 60% relative humidity (at 30° C.) and 450 ppmv CO$_2$ concentration after 1000 min. adsorption measured across six samples produced from two activated carbon mesh 20-40 batches was found to be 1.4±0.1 mmol/g. The average capacity after 180 min. adsorption was found to be 0.68±0.06 mmol/g.

In order to identify the threshold desorption temperature the material was desorbed at different temperatures. Once the set temperature was reached, the material was left desorbing for two hours. After two hours the oven was left to cool until it reached 80° C. The material was then removed and tested with above described CO$_2$ adsorption protocol for CO$_2$ adsorption capacity.

The threshold temperature is concluded to be 115° C. because after desorbing at this temperature the total CO$_2$ capacity as described above is reached. When the material is desorbed at 110° C., the adsorption capacity was 1.02 mmol g$^{-1}$, indicating it was not fully desorbed.

The $CO_2$ capacity at the $CO_2$ adsorption conditions described above for the $K_2CO_3$ impregnated on 4-12 mesh activated carbon was found to be 1.687 mmol/g.

The $CO_2$ capacity at the $CO_2$ adsorption conditions described above for the $K_2CO_3$ impregnated extruded carbon was found to be 0.100 and 0.219 mmol/g for the two syntheses, hence, it is too little to qualify as feasible adsorbent for $CO_2$ capture from air.

Example 5. Temperature-Vacuum-Swing Desorption of Adsorbents

For commercial application of the adsorbents described herein desorption methods are required which produce a concentrated stream of $CO_2$ during desorption. Temperature-vacuum-swing (TVS) desorption is a desorption technique used mainly for amine-modified adsorbents for their regeneration. In this example we tested whether TVS desorption is also feasible for desorption of $K_2CO_3$ modified activated carbons.

The method for the TVS desorption was as follows:
1. The adsorbent was desorbed in the oven at 150° C. and 40 grams were weighed out for the experiment.
2. The 40 g of dry mass was filled into a rectangular $CO_2$ adsorption/desorption chamber having inner dimensions of 62 mm×62 mm×72 mm.
3. For TVS desorption the chamber containing the adsorbent was heated by an external source to 150° C. and the pressure was reduced to 100 mbar with a vacuum pump for a duration of 300 min.
4. After the desorption, the chamber is cooled to 30° C. and once this temperature was reached $CO_2$ adsorption was performed with air at a temperature of 30° C., a flow rate of 15.0 NL/min, a $CO_2$ concentration of 450 ppmv, a relative humidity of 60% at 30° C. for a duration of 1000 min.
5. The adsorption and desorption were repeated for 5 consecutive cycles.

Figure 12:
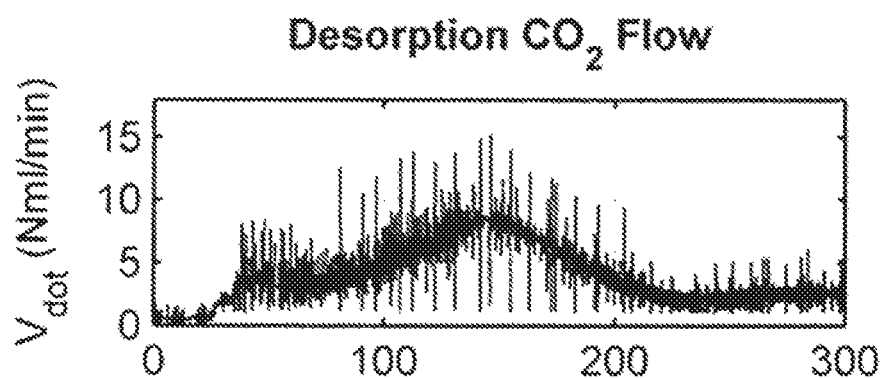
FIG. 12 shows $CO_2$ desorption flow during TVS desorption of 40 g of $K_2CO_3$/AC V at 100 mbar and 150° C.

FIG. 12 shows the $CO_2$ desorption flow during TVS desorption of 40 g of $K_2CO_3$/AC V at 100 mbar and 150° C. Integration of the signal of the flow measurement device yielded a $CO_2$ desorption capacity of 1.3 mmol $CO_2$/g and subsequent $CO_2$ adsorption yielded 1.2 mmol $CO_2$/g, consequently confirming that the adsorbent can be regenerated with TVS desorption.

Example 6. Mercury Porosimetry Measurements

Mercury porosimetry measurements were performed to analyze the pore sizes and pore volumes not accessible through $N_2$ adsorption measurements (see Example 3). In order to perform mercury porosimetry measurements the ISO 15901-1 measurement standard was followed and the following parameters were used:
Mercury surface tension: 0.48 N/m
Mercury contact angle: 150°
Test method: PASCAL (Pressurized by Automatic Speed-up and Continuous Adjustment Logic)
Max. pressure: 400 MPa
Increase speed: 6-19 MPa/min
Preparation: Degassing for 30 min. (also ensured <0.03 kPa reached)
The results of Hg porosimetry analysis are summarized the following table:

TABLE 6

Results obtained with Hg porosimetry analysis

| Sample ID | Total pore volume/ cm$^3$ g$^{-1}$ | Pore volume 50-1'000 nm/cm$^3$ g$^{-1}$ |
|---|---|---|
| AC mesh 20-40 batch 2 | 0.65 | 0.23 |
| AC mesh 4-12 | 0.62 | 0.25 |
| AC extruded | 0.29 | 0.03 |
| $K_2CO_3$/AC mesh 20-40 batch 2 | 0.38 | 0.06 |
| $K_2CO_3$/AC mesh 4-12/ $K_2CO_3$ | 0.29 | 0.08 |
| $K_2CO_3$/AC extruded/ $K_2CO_3$ | 0.24 | 0.03 |

Figure 13:
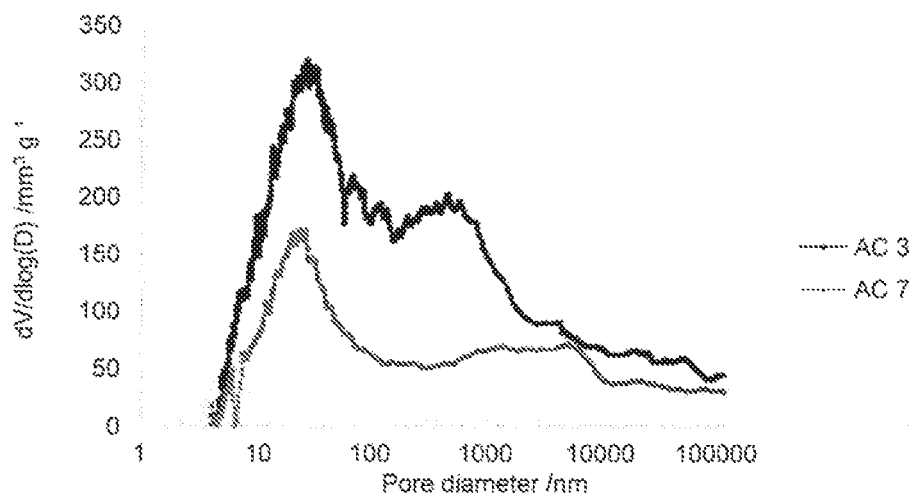
FIG. 13 shows pore size distributions of AC 3:AC mesh 4-12 and AC 7: $K_2CO_3$/AC mesh 4-12 obtained by mercury porosimetry analysis

FIG. 13 shows the pore size distributions for AC mesh 4-12 and $K_2CO_3$/AC mesh 4-12. It can be seen that the pore volume over the complete measurement range 3-120'000 nm is reduced for the material modified with $K_2CO_3$, indicating that all pores sizes contribute to $K_2CO_3$ modification. It can be further seen that the pore volume reduction after $K_2CO_3$ impregnation in the pore size range of 20-1'000 nm is the largest, indicating that this is the most feasible pore size range for activated carbon adsorbents modified with $K_2CO_3$ used for $CO_2$ capture from air.

Figure 14:
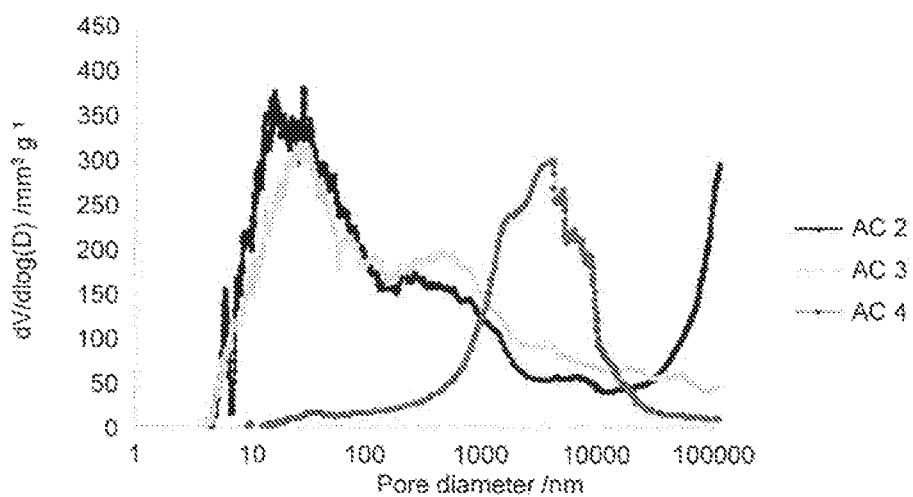
FIG. 14 shows pore size distributions of AC2: mesh 20-40 batch 2, AC 3: mesh 4-12 and AC 4: AC extruded obtained with mercury porosimetry analysis

FIG. 14 summarizes the pore size distributions for AC mesh 20-40, AC mesh 4-12 and AC extruded. It can be seen that AC mesh 20-40 and AC mesh 4-12 have very different pore size distributions than AC extruded. AC extruded contains mostly micropores and macropores in the size range above 1000 nm. Such pore sizes are not favourable for activated carbons modified with $K_2CO_3$ for $CO_2$ capture from air. In turn pore sizes in the range of 5-1'000 nm, as present in AC mesh 20-40 and AC mesh 4-12 are suitable for activated carbons modified with $K_2CO_3$ to be used for $CO_2$ capture from air.

Example 7: Synthesis of Activated Carbon/$Na_2CO_3$/$K_2CO_3$ Sorbents (See Also More Detailed Sorbent Production Further Below)

Utilized chemicals and materials:
Extruded activated carbon, AC 12 (Table 10).
$K_2CO_3$, CAS no.: 584-08-7, Sigma Aldrich Potassium Cabonate Anhydrous
$Na_2CO_3$, Cas no: 497-19-8, Sigma Aldrich, Sodium Carbonate Anhydrous
Description of the Synthesis of Extruded Activated Carbon Impregnated with $Na_2CO_3$/$K_2CO_3$ $K_2CO_3$ and $Na_2CO_3$ (total 20 g) were dissolved in 120 ml of water, and 40 g of activated carbon was added to the solution and soaked overnight, after which the water was removed at 100 mbar and 60° C. The resulting samples were dried in oven at 150° C. for 2 hours. The synthesis was repeated by using different relative weight proportions of the sodium and potassium salts. The materials thus prepared contained 10, 30 and 50% wt. of the sodium salt with respect to the potassium salt.

Example 8: Temperature Swing Adsorption Desorption Cycles with Air Purge Using AC/$Na_2CO_3$/$K_2CO_3$ Sorbents The samples prepared in example 7 were tested using five cycles of adsorption-desorption as described in the following: 6 g of each material where placed in a steel vessel delimited by a steel net through which a controlled air flow of 2 l/min was passed. The air flowed through the samples had a controlled $CO_2$ concentration of 450 ppmv. The outgoing air flow was controlled for the $CO_2$ concentration using a $CO_2$ infrared sensor. During desorption, the desorption bed temperature was set to 94° C., and a constant air flow of 2 l/min was applied. Adsorption and desorption times were 300 minutes and 120 minutes respectively. Surprisingly cyclic adsorption capacities increased up to four times by using a mixture of Na and K carbonates, with respect to the adsorption capacities of the pure potassium carbonate salt, as shown in table

TABLE 7

Cyclic air purge adsorption capacities using mixed Na and K carbonates

| Mixture ratio [% wt. $Na_2CO_3$:$K_2CO_3$] | Cyclic air purge adsorption capacity [mmol/g] |
|---|---|
| 0:100 | 0.12 |
| 10:90 | 0.31 |
| 30:70 | 0.39 |
| 50:50 | 0.49 |

Example 9: Temperature-Vacuum-Swing Adsorption Desorption Cycle with AC/$Na_2CO_3$/$K_2CO_3$ Sorbents The TVS experiment of example 5 was repeated, with the following modifications: 120° C. of jacket temperature during the desorption phase; adsorption and desorption times of 300 minutes; material as prepared in Example 7; four consecutives adsorption and desorption cycles were applied. The results in table 8 show an increase of 50% of cyclic capacity of $CO_2$ for the material prepared with the combination 30-70 w % $Na_2CO_3$—$K_2CO_3$ as compared to the same material but only impregnated with $K_2CO_3$ in the same total weight proportion.

TABLE 8 cyclic TVS adsorption capacities using mixed Na and K carbonates

| Mixture ratio [% wt. $Na_2CO_3$:$K_2CO_3$] | Cyclic TVS adsorption capacity [mmol/g] |
|---|---|
| 0:100 | 0.40 |
| 10:90 | 0.49 |
| 30:70 | 0.60 |
| 50:50 | 0.42 |

Example 10: Use of Na/K Carbonate Mixtures to Decrease the Regeneration Temperature of a Sorbent System The TVS experiment of example 9 was repeated with the modifications described in the following. The material described in example 7 was impregnated with $K_2CO_3$ and used in a TVS experiment applying a desorption (jacket) temperature of 140° C.; another experiment was carried out using the material described in example 7 impregnated with a mixture of 30:70% wt. of Na/K carbonates, and using a desorption (jacket) temperature of 120° C. The results shown in table 9 show that the material impregnated with a mixture of Na and K carbonates afford a 20% increase in cyclic capacity at 20° C. lower (jacket) temperature with respect to the same material impregnated with the pure $K_2CO_3$.

TABLE 9 cyclic TVS adsorption capacities using pure and mixed Na and K carbonates at two different desorption temperatures

| Mixture ratio [% wt. $Na_2CO_3$:$K_2CO_3$] | Cyclic TVS adsorption capacity [mmol/g] at 140° C. desorption temperature | Cyclic TVS adsorption capacity [mmol/g] at 120° C. desorption temperature |
|---|---|---|
| 0:100 | 0.50 | 0.40 |
| 30:70 | 0.60 | 0.60 |

Figure 15:
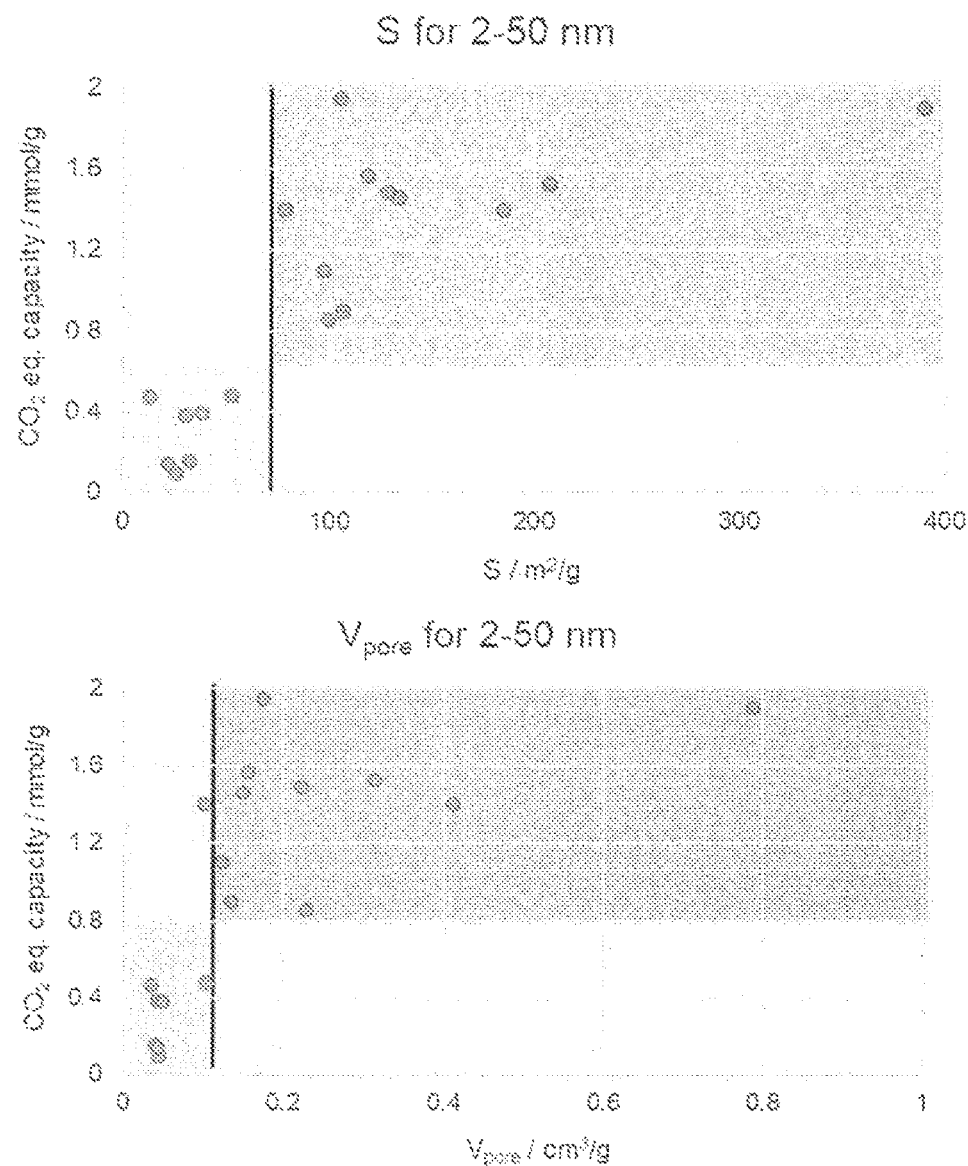
FIG. 15 shows the correlation between mesopore surface and mesopore volume of the AC support and the capacity to capture $CO_2$ of the $K_2CO_3$/AC sorbent material. AC supports with mesopore surface ≥80 m²/g and mesopore volume ≥0.1 cm³/g are the most apt for formulating the sorbent material
Figure 16:
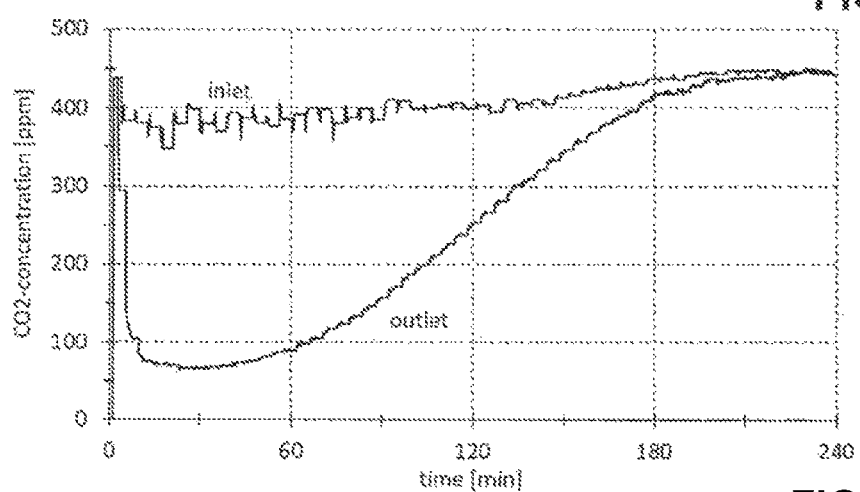
FIG. 16 shows an exemplary adsorption breakthrough curve of the demonstration plant at an airflow of approximately 1000 m3/h, yielding an uptake of 1.15 kg of $CO_2$
Figure 17:
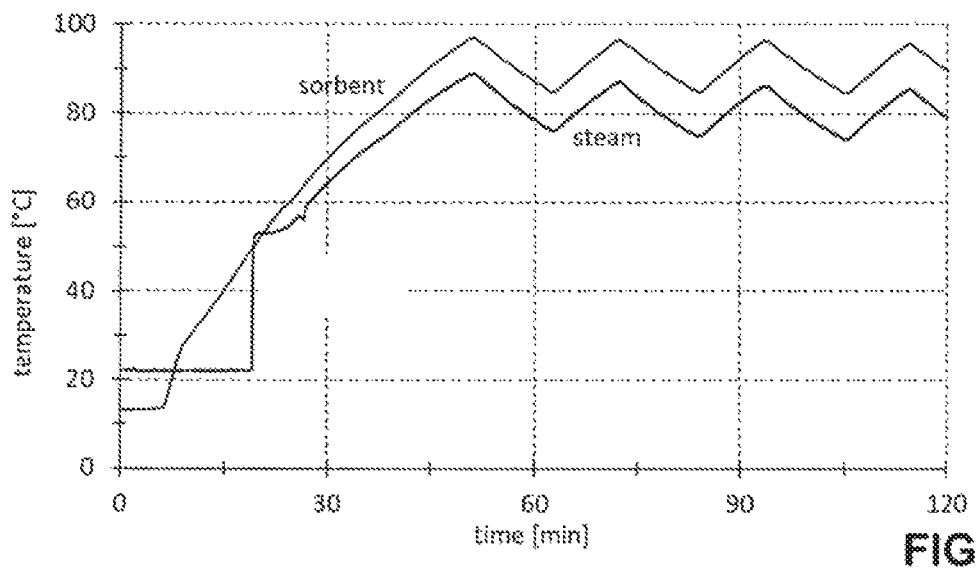
FIG. 17 shows an exemplary desorption sorbent and steam temperatures of the demonstration plant during desorption by method 1
Figure 18:
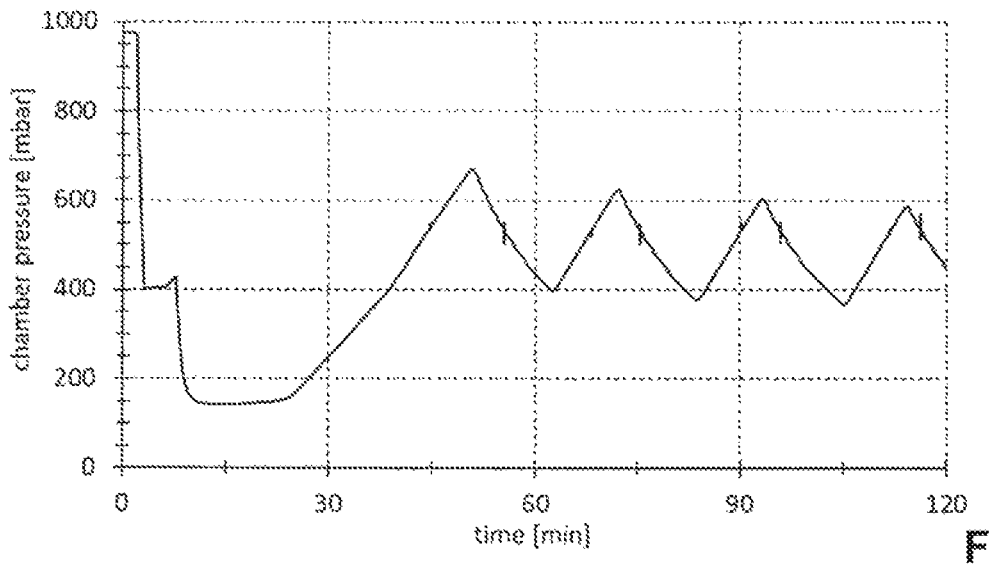
FIG. 18 shows an exemplary desorption chamber pressure of the demonstration plant during desorption by method 1
Figure 19:
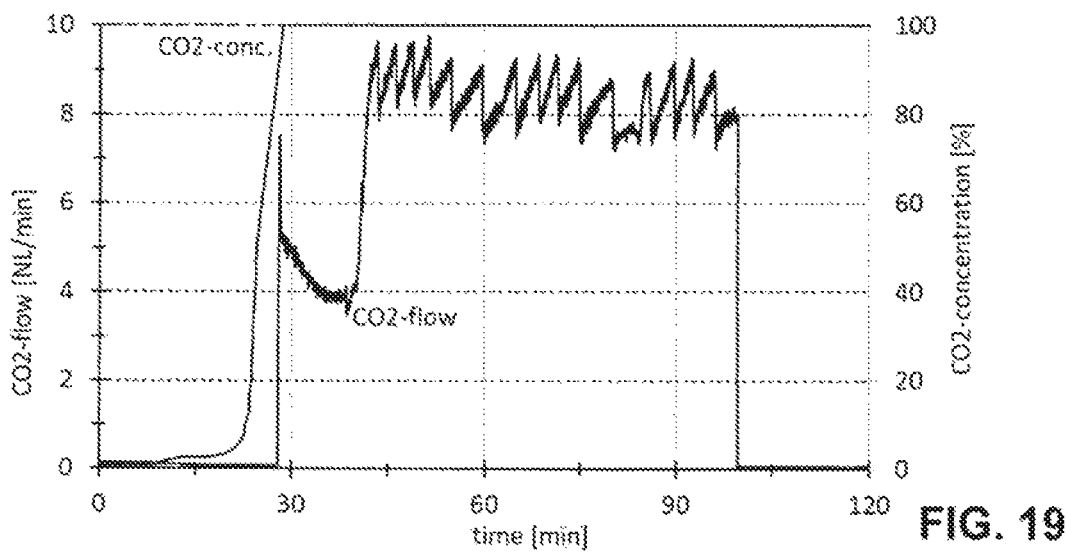
FIG. 19 shows an exemplary concentration and flow of the $CO_2$-product gas during desorption on the demonstration plant by method 1

Example 11: Correlation Between Mesopore Volume and Mesopore Surface of the AC and the $CO_2$ Capture Capacity of the $K_2CO_3$/AC Sorbent $K_2CO_3$/AC sorbents were prepared according to method described in Example 1, method 2, using as ingredients the activated carbons AC 1 to AC 18 listed in table 10. The pores size distribution and the mesopore volume and mesopore surface of the ACs were measured by nitrogen physisorption according to the method described in Example 3 and with the following specificities: prior to the analysis, the samples were outgassed at 150° C. for 12 hours under vacuum. For the calculation of the micro- and mesopore surface area contributions, the t-plot method was applied according to ISO 15901-3. The adsorption branch of the isotherm was used for the calculation. The $CO_2$ capture capacities of the resulting $K_2CO_3$/AC sorbents were measured according to the method already described in Example 4. The $CO_2$ capture capacities of the sorbents were plotted against the mesopore volume and the mesopore surface, revealing that the sorbents that were prepared using AC that had a mesopore volume $\geq 0.1$ cm$^3$/g, and/or a mesopore surface $\geq 80$ m$^2$/g showed superior capacities of $CO_2$ capture, measurable as $\geq 0.8$ mmol/g within the experimental setup already described, while the sorbent materials that were prepared using ACs that had a mesopore volume $\leq 0.1$ cm$^3$/g, and/or a mesopore surface $\leq 80$ m$^2$/g showed less pronounced capacities of $CO_2$ capture, measurable as $\leq 0.8$ mmol/g, and more often $\leq 0.4$ mmol/g within the experimental setup already described. The plot of reference is shown in FIG. 15. The optimal loading of the sorbent was not optimized, nonetheless a clear trend can be read in the plotted values.

TABLE 10

Properties of the activated carbons used for example 11

| No. | $V_{pore}$ [cm$^3$/g] | $V_{pore} <$ 2 nm [cm$^3$/g] | $V_{pore} \geq$ 2-50 nm [cm$^3$/g] | S < 2 nm [m$^2$/g] | S ≥ 2-50 nm [m$^2$/g] | $S_{BET}$ [m$^2$/g] | Particle size and type | Corresponding $CO_2$ capacity of modified AC [mmol/g] |
|---|---|---|---|---|---|---|---|---|
| AC 1 | 0.38 | 0.34 | 0.04 | 878 | 33 | 911 | 3 mm, extruded | 0.15 |

TABLE 10-continued

Properties of the activated carbons used for example 11

| No. | $V_{pore}$ [cm³/g] | $V_{pore}$ < 2 nm [cm³/g] | $V_{pore}$ ≥ 2-50 nm [cm³/g] | S < 2 nm [m²/g] | S ≥ 2-50 nm [m²/g] | $S_{BET}$ [m²/g] | Particle size and type | Corresponding $CO_2$ capacity of modified AC [mmol/g] |
|---|---|---|---|---|---|---|---|---|
| AC 2 | 0.358 | 0.323 | 0.035 | 798 | 13 | 811 | 3 mm, extruded | 0.47 |
| AC 3 | 0.683 | 0.578 | 0.105 | 1256 | 53 | 1309 | 4 mm, extruded | 0.48 |
| AC 4 | 0.425 | 0.383 | 0.042 | 973 | 39 | 1012 | 3 mm, extruded | 0.39 |
| AC 5 | 0.388 | 0.339 | 0.049 | 798 | 31 | 829 | 3 mm, extruded | 0.38 |
| AC 6 | 0.355 | 0.31 | 0.045 | 704 | 26 | 730 | 4 mm, pellet | 0.09 |
| AC 7 | 0.413 | 0.371 | 0.042 | 909 | 22 | 931 | 3 mm, extruded | 0.14 |
| AC 8 | 0.673 | 0.538 | 0.135 | 1128 | 107 | 1235 | 4 mm, extruded | 0.9 |
| AC 9 | 0.312 | 0.083 | 0.229 | 172 | 100 | 272 | 2 mm, pellets | 0.86 |
| AC 10 | 0.526 | 0.114 | 0.412 | 272 | 185 | 457 | 4-12 mesh, granular | 1.4 |
| AC 11 | 0.944 | 0.155 | 0.789 | 367 | 390 | 757 | 20-40 mesh, granular | 1.9 |
| AC 12 | 0.712 | 0.588 | 0.124 | 1425 | 98 | 1523 | 0.8 mm, extruded | 1.1 |
| AC 13 | 0.788 | 0.639 | 0.149 | 1531 | 134 | 1665 | 0.8 mm, extruded | 1.46 |
| AC 14 | 0.629 | 0.406 | 0.223 | 874 | 129 | 1003 | 8-30 US mesh, granular (0.6-2.36 mm) | 1.49 |
| AC 15 | 0.604 | 0.503 | 0.101 | 1245 | 79 | 1324 | 0.5-0.8 mm, spherical | 1.4 |
| AC 16 | 0.445 | 0.289 | 0.156 | 723 | 119 | 842 | 8-30 US mesh, granular (0.6-2.36 mm) | 1.57 |
| AC 17 | 0.606 | 0.292 | 0.314 | 711 | 207 | 918 | 8-30 US mesh, granular (0.6-2.36 mm) | 1.53 |
| AC 18 | 0.496 | 0.32 | 0.176 | 770 | 106 | 876 | 12-40 US mesh, granular (0.425-1.7 mm) | 1.95 |

Example 12. Sorbent and its Production

Figure 20:
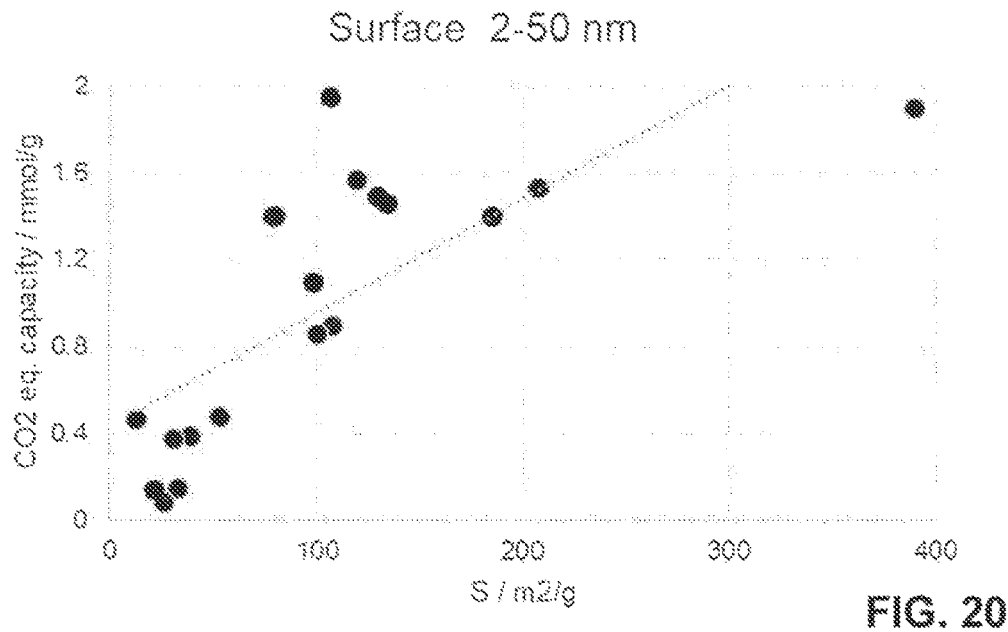
FIG. 20 shows the correlation between the mesopore surface of the pristine activated carbon ingredient and the $CO_2$ adsorption capacity of the sorbent

FIG. 20 shows the correlation between the mesopore surface of the pristine activated carbon ingredient and the $CO_2$ adsorption capacity of the sorbent.

We hereby show that for activated carbon supports impregnated with $K_2CO_3$ the $CO_2$ adsorption capacities from ambient air increases with increasing mesopore surface. In particular activated carbons having mesopore surfaces above 80 m2/g are especially apt as formulation ingredient. The range of 80-600 m2/g, and most preferably 80-400 m2 g, is optimum for the mesopore surface of the activated carbon ingredient used in the formulation of the sorbent as described further below.

To obtain a good sorbent it is important that the $K_2CO_3$-solution enters the pores of the support and infiltrates the large internal surface area. Capillary forces can be assumed to be a major driving force for this process. However, before the infiltration the pores are usually filled with air that needs to be replaced and that takes time to diffuse out of the porous support. Usually, rather long soaking times >12 h are used for the impregnation of activated carbon with $K_2CO_3$. The infiltration can be accelerated by the application of vacuum to remove the entrapped air followed by a return to atmospheric pressure to push the solution into the pores.

The application of a vacuum of 100 mbar for 2 times 5 min followed by a return to ambient pressure at the beginning of a 3 h impregnation period allowed improving the $CO_2$-adsorption capacity of the sorbent by a factor of 2.4 for a 180-min adsorption experiment. To be specific the capacity raised from 0.37 mmol/g to 0.88 mmol/g. The performance of the sorbent produced within 3 h with initial vacuum is similar to a sorbent produced by impregnating 18 h without initial vacuum. The latter one showed an adsorption capacity of 0.84 mmol/g. The differences between the two can be regarded to be within the experimental error.

Figure 21:
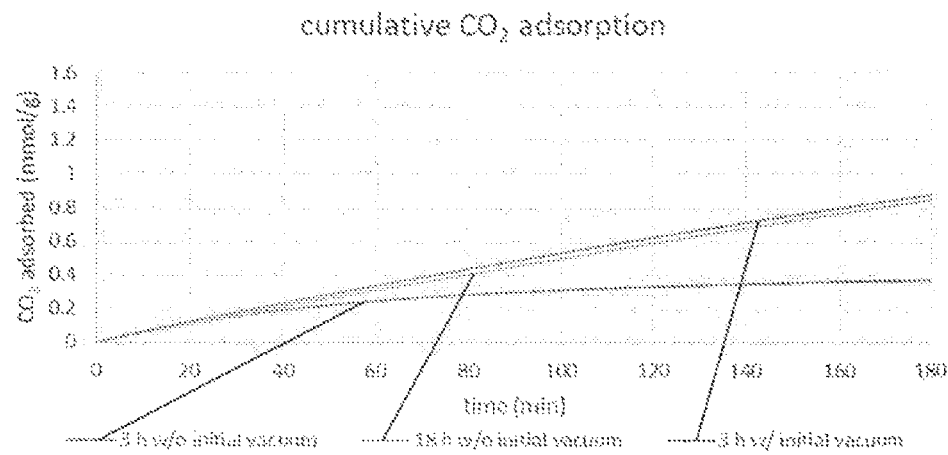
FIG. 21 shows the cumulative $CO_2$ adsorption curves for the examined sorbents

FIG. 21 shows the cumulative $CO_2$ adsorption curves for the examined sorbents

Figure 22:
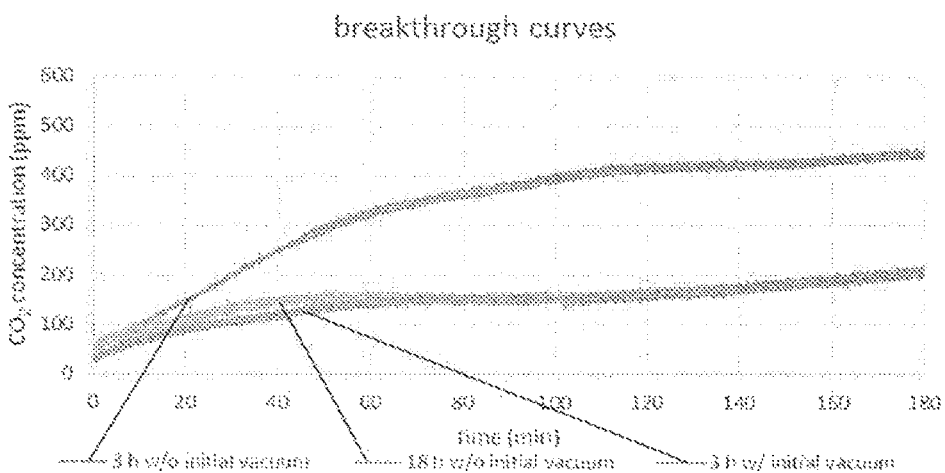
FIG. 22 shows the breakthrough curves for the examined sorbents.

The same trend can be observed in the break through curves shown in FIG. 22. The two curves of the sorbent prepared in 3 h with initial vacuum and the one of the sorbent prepared in 18 h without initial vacuum are almost identical and did not reach breakthrough within 180 min adsorption time. In contrast, the sorbent prepared in 3 h without initial vacuum showed a much steeper breakthrough curve reaching 90% of the inlet $CO_2$ concentration already in less than 2 h.

FIG. 22 shows the breakthrough curves for the examined sorbents

From the data shown it can be concluded that applying vacuum for a short period of time followed by returning to ambient pressure at the beginning of the impregnation of a porous support material with a solution of an active phase is effective in drastically reducing the necessary impregnation time. For a sorbent based on activated carbon and $K_2CO_3$ we could realize a reduction of the soaking time by a factor of six. This is highly improving the state-of-the art preparation of such materials, reducing drastically the production time and costs and simultaneously increasing the production capacity of a given facility.

Sorbent Preparation:

To prepare 30 g dry sorbent 10 g $K_2CO_3$ (Sigma Aldrich, analytical grade) were dissolved in a 1 l pear flask in 60 ml de-ionized water by mildly shaking it. To the clear solution 20 g activated carbon (Sigma Aldrich, DARCO 20-40 mesh) were added. The flask was mounted on a rotary evaporator (Heidolph) and rotated at approx. 30 rpm for 3 or 18 h as required. For the sample with initial vacuum the apparatus was evacuated to approx. 100 mbar followed by venting to ambient pressure with air. This step was repeated once. The soaking was done in any case at ambient pressure. After the required impregnation time, the flask was lowered in a water bath at 60° C. and vacuum was applied at approx. 100 mbar to evaporate the water. After 30-45 min the dried sorbent was collected from the flask and stored in a plastic bottle until further use.

Sorbent Characterization:

Prior to the measurement of the adsorption characteristics the sorbent was spread on a tray and placed in an oven (Binder) at 150° C. for at least 2 h to desorb any pre-adsorbed CO2 or H2O.

Immediately afterwards 6 g of the sorbent (assumed solid content: 100%) were weighed into the measurement cell and transferred into the reactor of the RC testing unit. The reactor was sealed immediately to avoid $CO_2$ or $H_2O$ take-up from air and the adsorption measurement was started using the following parameters:

Adsorption flow: 2 Nl/min; Adsorption temperature: 30° C.; $CO_2$ concentration adsorption gas: 450 ppm; Relative Humidity: 60% rH (30° C.).

The invention claimed is:

1. A method for making a particulate activated carbon material for capturing $CO_2$ from air,
    wherein the particulate activated carbon is impregnated with two different alkali carbonate salts: $K_2CO_3$ and $Na_2CO_3$,
    wherein the alkali carbonate salt with the smallest weight proportion is present in an amount of at least 5 weight % with respect to the total of an impregnating mixture of the two alkali carbonate salts,
    wherein said two alkali carbonate salts are dissolved in a solvent,
    wherein pristine particulate activated carbon having a specific surface area, determined using nitrogen adsorption methods as described in ISO 15901-2 and ISO 15901-3 and using a t-plot method, of at least 80 $m^2/g$ in the pore size range of more than 2 nm to at most 50 nm, is added to form a suspension, and
    wherein subsequently at least a solid fraction is isolated, dried by evaporation, or both, to obtain the impregnated particulate activated carbon.

2. The method according to claim 1,
    wherein the solvent is water.

3. The method according to claim 1,
    wherein the pristine particulate activated carbon has a pore volume of at least 0.1 cm3/g in the pore size range more than 2 nm to at most 50 nm,
    or
    wherein the pristine particulate activated carbon has a specific surface area of 80-600 m2/g, in the pore size range of more than 2 nm to at most 50 nm,
    in each case determined using nitrogen adsorption methods according to ISO 15901-2 and ISO 15901-3 and according to the t-plot method.

4. The method according to claim 1,
    wherein the suspension is subjected to at least one time period with reduced pressure, and
    wherein before isolation of the impregnated particulate activated carbon the suspension is returned to ambient pressure for a time period of at least 60 seconds.

5. A particulate activated carbon material for capturing $CO_2$ from air,
    wherein the particulate activated carbon is impregnated with two different alkali carbonate salts: $K_2CO_3$ and $Na_2CO_3$,
    wherein the alkali carbonate salt with the smallest weight proportion is present in an amount of at least 5 weight % with respect to a total of an impregnating mixture of the alkali carbonate salts,
    wherein at least one of the following conditions applies:
    the impregnated particulate activated carbon has, determined using nitrogen adsorption methods as described in ISO 15901-2 and ISO 15901-3 and according to the QSDFT calculation scheme,
    a) a pore volume of at least 0.10 $cm^3/g$ for pore sizes of at least 5 nm and a pore volume of at most 0.30 $cm^3/g$ for pore sizes of less than 5 nm;
    b) a pore volume of at least 0.04 $cm^3/g$ for pore sizes of at least 2 nm and a pore volume of at most 0.35 $cm^3/g$ for pore sizes of less than 2 nm;
    c) a pore surface of at least 20 m2/g for pore sizes above 2 nm or in the range of 2-50 nm.

6. The material according to claim 5, wherein the alkali carbonate salt impregnated particulate activated carbon has,
    a pore volume of at least 0.1 $cm^3/g$ for pore sizes above 5 nm or in the range of 5-50 nm, determined using nitrogen absorption methods as described in ISO 15901-2 and ISO 15901-3 according to the QSDFT calculation scheme,
    or
    a pore volume of at least 0.05 $cm^3/g$ for pore sizes in the range of 50-1,000 nm, as determined using mercury porosimetry analysis as described in ISO 15901-1,
    or
    a pore volume of at most 0.25 $cm^3/g$ or at most 0.2 $cm^3/g$ or in the range of 0.05-0.2 $cm^3/g$ or 0.05-0.15 $cm^3/g$, for pore sizes of less than 5 nm, determined using nitrogen absorption methods as described in ISO 15901-2 and ISO 15901-3 according to the QSDFT calculation scheme,
    or
    wherein the alkali carbonate salt impregnated particulate activated carbon has, determined using nitrogen adsorption methods as described in ISO 15901-2 and ISO 15901-3 and according to the QSDFT calculation scheme,
a pore surface of at least 20 m²/g for pore sizes above 5 nm or in the range of 5-50 nm,
or
a pore surface of at most 500 m²/g or in the range of 150-500 or 100-400 m²/g for pore sizes of less than 5 nm.

7. The material according to claim 5,
wherein the impregnated particulate activated carbon has a BET surface area according to ISO 9277 in the range of 100-800 m²/g, or of less than 500 m²/g
or
wherein the impregnated particulate activated carbon has a tapped density in the range of 300-800 kg/m³,
or
wherein the impregnated particulate activated carbon has a particle size in the range of 0.1-8 mm, or in the range of mesh (ASTM) 3-140.

8. The material according to claim 1,
wherein the impregnated particulate activated carbon contains at least 10% by weight of alkali carbonate salt.

9. The material according to claim 5,
wherein the alkali carbonate salt impregnated particulate activated carbon has an average carbon dioxide capacity, at 30° C., 60% relative humidity and 450 ppmv carbon dioxide concentration after 1000 minutes adsorption in the range of 0.5-5 mmol/g, or
wherein the particles of the alkali carbonate salt impregnated particulate activated carbon are essentially spherical, extruded rods, pellets.

10. A carbon dioxide capture device comprising a material according to claim 5.

11. The carbon dioxide capture device according to claim 10, wherein it comprises a housing in which the at least one air permeable container containing the particles of the alkali carbonate salt impregnated particulate activated carbon is located, wherein the housing has at least one opening for allowing in and/or allowing out atmospheric air for adsorption and closing lids for said at least one opening to close the housing as well as means for applying a vacuum and/or temperature change for release of the adsorbed carbon dioxide as well as means for removal of said adsorbed carbon dioxide from the housing and for collecting and/or further concentrating and/or condensing the carbon dioxide.

12. A method of using a material according to claim 5 for capturing carbon dioxide from atmospheric air.

13. A method for capturing carbon dioxide from atmospheric air using the material according to claim 5, wherein a temperature swing cycle or a temperature/vacuum swing cycle, with or without steam injected, is used for adsorption and desorption of the carbon dioxide.

14. The method according to claim 13,
where at least a part of the desorption of $CO_2$ is performed at a pressure in the range of 50-400 $mbar_{abs}$ and at a temperature in the range of 80-150° C.
or
where at least a part of the desorption of $CO_2$ is performed at a pressure in the range of 50-400 $mbar_{abs}$ and at a temperature of 35-80° C. and another part of the desorption of $CO_2$ is performed at a temperature in the range of 80-150° C.

15. The method according to claim 1 wherein said pristine particulate activated carbon is at least one of dried and purified before use.

16. The method according to claim 1,
wherein the solvent is deionized water, and wherein the concentration of the alkali carbonate salt is 1-8 mmol (total) alkali carbonate salt per ml water, or 1.5-4.5 mmol/m1 water, or
wherein as pristine particulate activated carbon a pristine, non-oxidized, particulate activated carbon is added to the solution under stirring, at a temperature in the range of 5-40° C., or at a temperature in the range of 20-30° C., or for a time span in the range of 30 minutes-100 hours, or in the range of 6 hours-40 hours, and
wherein subsequently at least the solid fraction is isolated and/or dried by evaporation, including vacuum evaporation.

17. The method according to claim 1,
wherein the pristine particulate activated carbon has a pore volume of at least 0.1 cm3/g and at most 2.5 cm3/g in the pore size range more than 2 nm to at most 50 nm, or
wherein the pristine particulate activated carbon has a specific surface area of 80-400 m2/g in the pore size range of more than 2 nm to at most 50 nm,
in each case determined using nitrogen adsorption methods according to ISO 15901-2 and ISO 15901-3 and according to the t-plot method.

18. The method according to claim 1,
wherein the suspension is subjected to at least one time period with a vacuum of at most 300 mbar, or at most 200 mbar, or in the range of 10-150 mbar, wherein that reduced pressure time period is at least 60 seconds, or at least 2 minutes, or 3-20 or 5-10 minutes, and
wherein before isolation of the impregnated particulate activated carbon the suspension is returned to ambient pressure for a time period of at least 60 seconds,
wherein at least two such cycles including a time period of reduced pressure of at least 60 seconds, or of at least 2 min, are used and a following time period of at least 60 seconds, or of at least 2 min, of ambient pressure is carried out, and
wherein the total impregnation period before isolation can be in the range of 2-5 hours, or in the range of 2.5-3.5 hours.

19. The particulate activated carbon material according to claim 5,
wherein said material is prepared using pristine particulate activated carbon, having a specific surface area, determined using nitrogen adsorption methods as described in ISO 15901-2 and ISO 15901-3 and using a t-plot method, of at least 80 m²/g in the pore size range of more than 2 nm to at most 50 nm, added to a solution of $K_2CO_3$ and $Na_2CO_3$.

20. The particulate activated carbon material according to claim 5, wherein the impregnated particulate activated carbon has, determined using nitrogen adsorption methods as described in ISO 15901-2 and ISO 15901-3 and according to the QSDFT calculation scheme, a pore surface in the range of 40-250 or 45-200 m2/g for pore sizes above 2 nm or in the range of 2-50 nm.

21. The particulate activated carbon material according to claim 5,
wherein the alkali carbonate salt impregnated particulate activated carbon has:
a pore volume in the range of 0.1-2.2 or 0.2-1.5 cm³/g for pore sizes above 5 nm or in the range of 5-50 nm, determined using nitrogen absorption methods as described in ISO 15901-2 and ISO 15901-3 according to the QSDFT calculation scheme,
or
a pore volume in the range of 0.05-0.2 cm³/g or 0.05-0.15 cm³/g, for pore sizes of less than 5 nm, determined using nitrogen absorption methods as described in ISO 15901-2 and ISO 15901-3 according to the QSDFT calculation scheme, or wherein the alkali carbonate salt impregnated particulate activated carbon has, determined using nitrogen adsorption methods as described in ISO 15901-2 and ISO 15901-3 and according to the QSDFT calculation scheme, a pore surface in the range of 20-500 or 50-400 $m^2/g$ for pore sizes above 5 nm or in the range of 5-50 nm, or a pore surface in the range of 150-500 or 100-400 $m^2/g$ for pore sizes of less than 5 nm.

22. The particulate activated carbon material according to claim 5, wherein the impregnated particulate activated carbon has a tapped density in the range of 400-600 $kg/m^3$, or wherein the impregnated particulate activated carbon has a particle size in the range of 0.5-1.5 mm, or in the range of mesh (ASTM) 4-50.

23. The particulate activated carbon material according to claim 5, wherein an impregnating mixture of said two alkali carbonate salts is consisting of $K_2CO_3$ as well as $Na_2CO_3$, in a weight ratio of $K_2CO_3$ to $Na_2CO_3$ in the range of 95:5-5:95, or in the range of 90:10-10:90, or in the range of 40:60-95:5.

24. The particulate activated carbon material according to claim 1, wherein the impregnated particulate activated carbon contains at least 20% by weight or at least 30% by weight, or in the range of 25-45% by weight of $K_2CO_3$.

25. The particulate activated carbon material according to claim 5, wherein the alkali carbonate salt impregnated particulate activated carbon has an average carbon dioxide capacity, at 30° C., 60% relative humidity and 450 ppmv carbon dioxide concentration after 1000 minutes adsorption in the range of 1-2.5 mmol/g or after 180 minutes adsorption in the range of 0.5-2 mmol/g or in the range of 0.6-1.5 mmol/g or wherein the particles of the alkali carbonate salt impregnated particulate activated carbon are essentially spherical, extruded rods, or pellets.

26. A carbon dioxide capture device comprising a material according to claim 5, in the form of at least one air permeable container comprising said material in particulate form, including in the form of a multitude of layers of such containers arranged in a stack.

27. The method according to claim 12 comprising using a carbon dioxide capture device for capturing carbon dioxide from atmospheric air, in a cyclic process, said device having said particulate activated carbon material.

28. A method for capturing carbon dioxide from atmospheric air using a carbon dioxide capture device having the material according to claim 5, wherein a temperature swing cycle or a temperature/vacuum swing cycle, with or without steam injected, is used for adsorption and desorption of the carbon dioxide.

29. The method according to claim 13, where at least a part of the desorption of $CO_2$ is performed at a pressure in the range of 100-300 $mbar_{abs}$ and at a temperature in the range of 80-150° C., or where at least a part of the desorption of $CO_2$ is performed at a pressure in the range of 100-300 $mbar_{abs}$ and at a temperature of 45-80° C. and another part of the desorption of $CO_2$ is performed at a temperature in the range of 90-135° C.

* * * * *